(12) United States Patent
Shimizu et al.

(10) Patent No.: US 6,657,555 B2
(45) Date of Patent: *Dec. 2, 2003

(54) PARKING OPERATION AIDING SYSTEM

(75) Inventors: Yasuo Shimizu, Wako (JP); Kenichi Takishita, Wako (JP); Katsuhiro Sakai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 40 days.

This patent is subject to a terminal disclaimer.

(21) Appl. No.: 10/014,829

(22) Filed: Dec. 14, 2001

(65) Prior Publication Data

US 2002/0084916 A1 Jul. 4, 2002

(30) Foreign Application Priority Data

Dec. 15, 2000 (JP) ......................................... 2000-381299
Jun. 18, 2001 (JP) ......................................... 2001-183778

(51) Int. Cl.$^7$ .................................................. B60G 1/48
(52) U.S. Cl. ..................... 340/932.2; 340/901; 340/903; 340/435; 340/436; 180/204; 180/445
(58) Field of Search ............................. 340/932.2, 901, 340/903, 435, 436, 936, 937, 943; 180/204, 445

(56) References Cited

U.S. PATENT DOCUMENTS

| 4,936,671 | A | * | 6/1990 | Kaspar | ........................ 359/877 |
| 5,742,141 | A | * | 4/1998 | Czekaj | ........................ 318/587 |
| 6,170,591 | B1 | * | 1/2001 | Sakai | ........................ 180/204 |
| 6,223,847 | B1 | * | 5/2001 | Shimizu et al. | ............. 180/204 |

* cited by examiner

*Primary Examiner*—Jeffery Hofsass
*Assistant Examiner*—Daniel Previl
(74) *Attorney, Agent, or Firm*—Arent Fox Kintner Plotkin & Kahn, PLLC

(57) ABSTRACT

A parking operation aiding system includes a display for displaying parking-aiding information including a target parking position and a vehicle position. The system also includes a locus calculating means for calculating an expected movement locus for a subject vehicle in accordance with a distance of movement of the vehicle and a steering angle, an interference determining means for determining whether the expected movement locus will interfere with the target parking position, and an information determining means for determining subsequent parking operation aiding information based on the presence or absence the interference.

24 Claims, 24 Drawing Sheets

FORWARD MOVEMENT

BACKWARD MOVEMENT

PARKING OPERATION AIDING SYSTEM

BACKGROUND OF THE INVENTION

1. Field of the Invention

The present invention relates to a parking operation aiding system for aiding drivers in performing a backward parking or a longitudinal parking is conducted.

2. Description of the Related Art

A parking operation aiding system is already known from Japanese Patent Application Laid-open No. 11-157404. In this parking operation aiding system, a target parking position is determined in accordance with a situation of a surrounding obstacle detected by a camera, a radar, a corner sensor or the like, and a recommended locus from a current vehicle position to the target parking position is calculated. Then, the recommended locus is displayed on a display unit along with an image of the target parking position, thereby indicating steering operation, a braking operation, an operation of an accelerator pedal, a gear-change operation to a driver to aid the parking operation.

When it is difficult to aid the parking operation due to the extent of the target parking position or the situation of the surrounding obstacle, the vehicle can be guided accurately to the target position in some cases when the vehicle is turned-back in the course of backward movement of the vehicle toward the target parking position. However, this prior art parking operation aiding system suffers from a problem that it cannot in some cases, determine whether the parking is possible without the turning-back of the vehicle. This results in poor performance when the system cannot aid the parking operation without turning back the vehicle.

SUMMARY OF THE INVENTION

Accordingly, it is an object of the present invention to provide a parking operation aiding system, wherein the driver's parking operation can be aided to the maximum in accordance with the extent of the target parking position and the situation of the surrounding obstacle.

To achieve the above object, a parking operation aiding system according to the present invention can have an arrangement shown in a claim-correspondence figure in FIG. 2.

More specifically, according to one aspect of the present invention, provided is a parking operation aiding system comprising a display for displaying parking-aiding information. The information may include at least a target parking position and a vehicle position that can be visually confirmed by a driver. The system may also include a locus calculating means for calculating an expected movement locus of the vehicle at any point of time based on a predetermined steering angle, an interference determining means for determining whether the expected movement locus calculated by the locus calculating means will interfere with the target parking position, and an information determining means for determining subsequent parking operation aiding information based on the result of the determination provided by the interference determining means.

With the above arrangement, when it is determined by the interference determining means whether the expected movement locus for the vehicle calculated by the locus calculating means will interfere with the target parking position, the information determining means determines the subsequent parking operation aiding information based on the result of the interference determining means. Therefore, the parking operation aiding information, including the target parking position and the vehicle position, displayed on the display, can be changed depending on the presence or absence of the interference. Thus, the parking operation aiding information, which depends on the presence or absence of the interference of the expected movement locus with the target parking position, can be provided to the driver, and the effective aiding of the parking operation can be always carried out irrespective of the situation of the extent of the target parking position and a surrounding obstacle.

According to another aspect of the present invention, the display may further display the expected movement locus calculated by the locus calculating means so that it can be visually confirmed by the driver. The display may change and display the positional relationship of the expected movement locus to the target parking position in response to at least either one of the movement of the vehicle and change of the steering angle.

With this arrangement, the display is able to display the expected movement locus for the vehicle in addition to the target parking position and the vehicle position, and can further display the positional relationship of the expected movement locus to the target parking position in a changed manner in response to at least either one of the movement of the vehicle and the change of the steering angle. Therefore, the driver can reliably recognize that the vehicle will be moved through what path toward the target position.

According to another aspect of the present invention, the predetermined steering angle may be the largest clockwise or counterclockwise steering angle.

With this arrangement, the expected movement locus calculated by the locus calculating means can be provided based on when the steering angle is the largest clockwise or counterclockwise steering angle. Therefore, the driver can guide the vehicle to the target parking position by moving the vehicle backwards with the steering angle only maintained at the largest steering angle, and the driver's driving operation is simplified. Thus, the driver can pay more attention to the surroundings.

According to another aspect of the present invention, the display can further display an expected parking position on top of the expected movement locus calculated by the locus calculating means.

With this arrangement, the expected parking position on top of the expected movement locus is displayed on the display, and hence, the driver can compare the two and more reliably visually confirm that the vehicle can be moved to the target parking position.

According to another aspect of the present invention, the interference determining means may determine whether the expected movement locus will interfere with the target parking position when the expected parking position is matched with the target parking position. Therefore, the driver can recognize whether the interference will occur when the vehicle has been moved from the current position to the target parking position.

According to another aspect of the present invention, the interference determining means may determine that the expected movement locus will interfere with the target parking position when an inner side of the vehicle, as viewed in a turning direction during movement of the vehicle toward the target parking position, will interfere with the target parking position laying inside in the turning direction. Therefore, it is possible to reliably determine a possibility of the interference in a position where the interference is most liable to occur.

According to another aspect of the present invention, when the interference determining means determines that the expected movement locus will interfere with the target parking position, the display can display an interfering position to be visually confirmed by the driver. Therefore, the driver can reliably recognize in which position that the interference will occur.

According to another aspect of the present invention, when the interference determining means determines that the expected movement locus will interfere with the target parking position, additional parking operation aiding information can be provided to the driver to confirm the presence of another vehicle located sideways of the target parking position. Therefore, the driver can recognize whether the interference with the other vehicle will occur actually.

According to another aspect of the present invention, the information determining means may include a turn-back validity determining means for determining whether the interference can be avoided by the turn-back movement of the vehicle, when the interference determining means determines that the expected movement locus will interfere with the target parking position. Therefore, the driver can recognize whether the parking operation should be restarted from the beginning, or if can be continued by conducting the turn-back movement of the vehicle.

According to another aspect of the present invention, the turn-back validity determining means can determine whether the turn-back movement is valid or not if an extension line from a side of the vehicle having a possibility of interference will not make contact with the target parking position or not. Therefore, it is possible to reliably determine the validity of the turn-back movement.

According to another aspect of the present invention, the information determining means may include a selecting means for selecting the turn-back movement. When the turn-back movement is selected, the locus calculating means can select an expected movement locus which will not interfere with the target parking position and the display can display a target turn-back position closer to the target parking position on top of the expected movement locus. Therefore, the driver can guide the vehicle without hindrance by moving the vehicle to the target turn-back position on the expected movement locus.

According to another aspect of the present invention, the display may display an expected movement locus based on an actual steering angle in place of the expected movement locus based on the predetermined steering angle, and may display a target turn-back position depending on the expected movement locus depending on the actual steering angle on such expected movement locus. Therefore, the driver can guide the vehicle to the target turn-back position by the steering operation.

According to another aspect of the present invention, when the vehicle reaches the target turn-back position and the turn-back operation is started, the display may display parking operation aiding information indicating a moving direction for the vehicle. Therefore, the driver can conduct the turn-back operation easily and reliably.

According to another aspect of the present invention, when the interference determining means determines that the expected movement locus will not interfere with the target parking position, the subsequent parking operation aiding information may be indicated. When such indication is carried out, the locus calculating means can calculate an expected movement locus based on the actual steering angle, and the display can display the expected movement locus.

With this arrangement, the indication of the parking operation aiding information is carried out after it is determined that the interference will not occur. The expected movement locus depending on the actual steering angle is calculated in place of the expected movement locus depending on the predetermined steering angle and is displayed on the display. Therefore, the driver can guide the vehicle to the target parking position, while conducting the fine regulation of the steering angle.

According to another aspect of the present invention, the display can display the expected movement locus depending on the actual steering angle in place of the expected movement locus depending on the predetermined steering angle. The display can also display an expected parking position depending on the expected movement locus on top of such expected movement locus.

With this arrangement, the expected movement locus depending on the actual steering angle is displayed on the display. Further, the expected parking position depending on the expected movement locus is displayed on top of the expected movement locus on the display. Therefore, the driver can guide the vehicle more reliably to the target parking position, while conducting the fine regulation of the steering angle.

According to another aspect of the present invention, the display can be adapted to change the displaying form between a form depending on the predetermined steering angle and a form depending on the actual steering angle. Therefore, the driver can reliably grasp whether the current displaying depends on the predetermined and actual steering angles.

According to another aspect of the present invention, the change of the displaying form may include a change of a displayed color and/or the change of the type of a displayed line. Therefore, the driver can more reliably grasp whether the current displaying is depending on which of the predetermined and actual steering angles.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of reference to the accompanying drawings.

Figure 1:
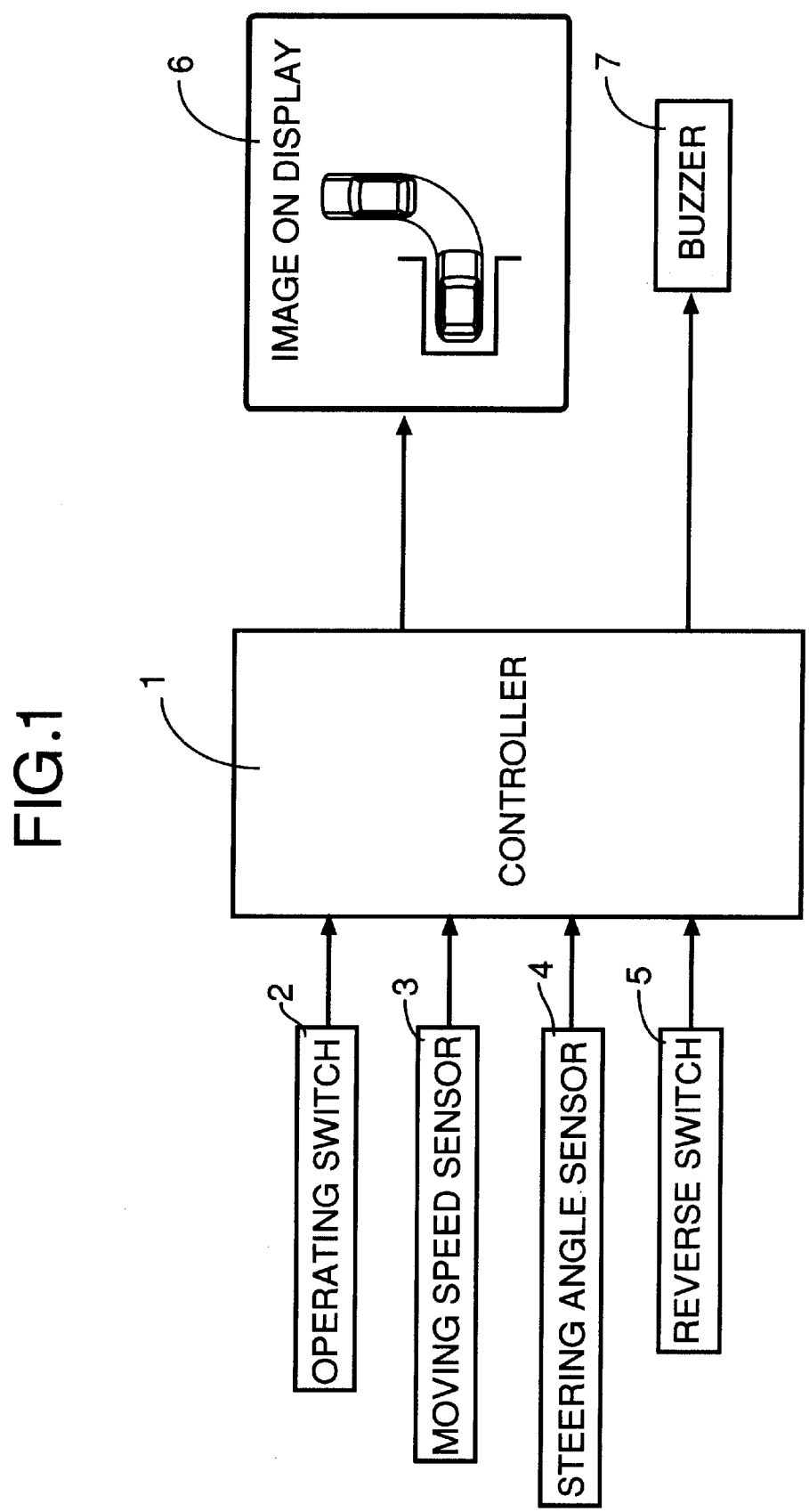
FIG. 1 is a block diagram showing an arrangement of a parking operation aiding system.
Figure 2:
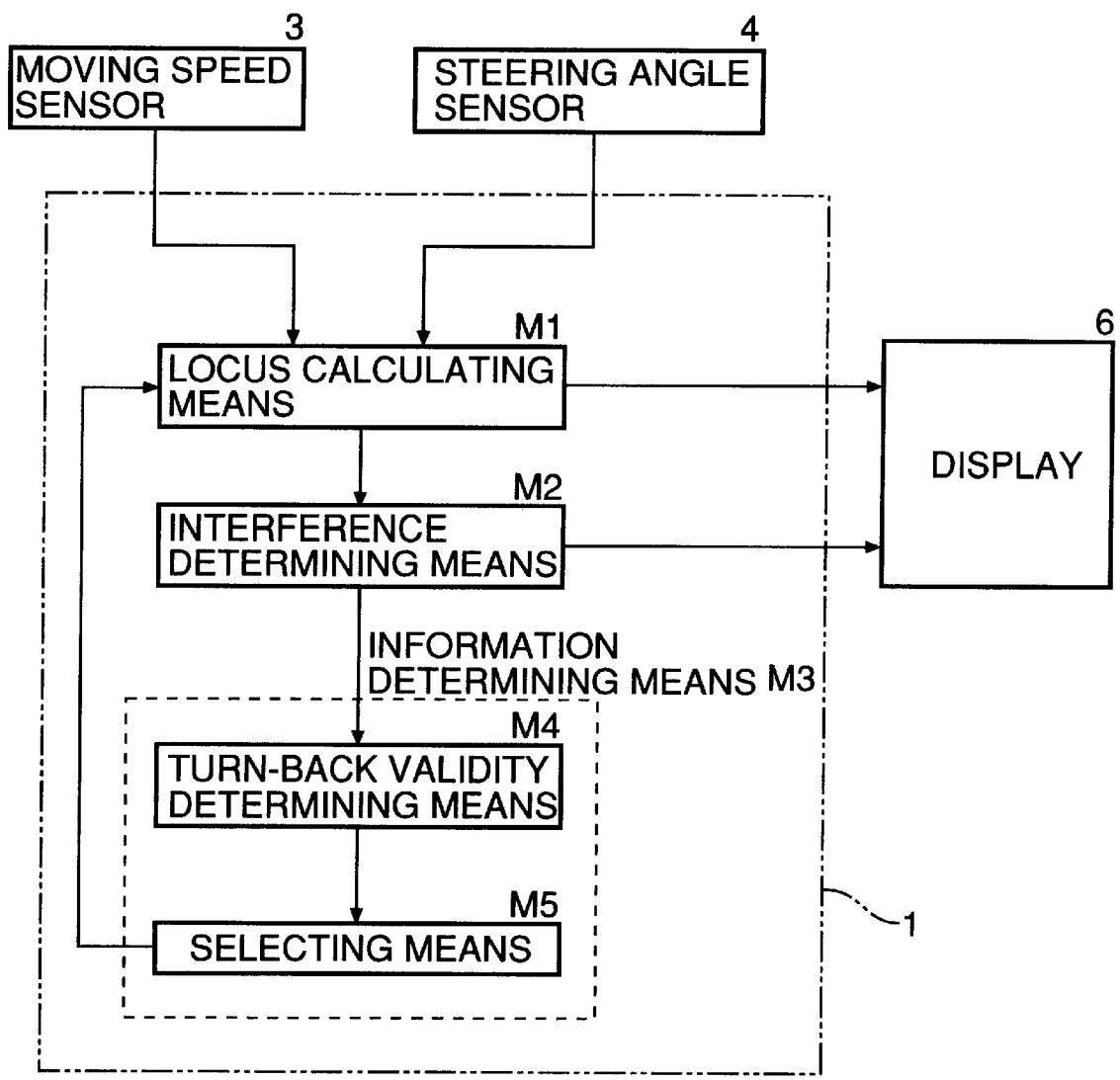
FIG. 2 is a block diagram showing a circuit of a controller (a claim-correspondence view)

Referring to FIG. 1, a parking operation-aiding system mounted on a vehicle, such as a two-wheel or four-wheel vehicle, includes a controller 1 which may comprise a microcomputer. An operating switch 2, a speed sensor 3, a steering angle sensor 4, a reverse switch 5, a display 6 and a buzzer 7 are connected to the controller 1.

The operating switch 2 is comprised of a power source switch member and a parking-mode selecting switch member (not shown). The power source switch member is operated by a driver for turning on and off a power source for the parking operation-aiding system. The parking-mode selecting switch member is for selecting one of three parking modes, namely, "a left backward parking mode," "a right backward parking mode," and "a left longitudinal parking mode." The parking-mode selecting switch member may be operated by a single switch button to change one of the three parking modes to the other parking mode sequentially each time it is pushed. The parking-mode selecting switch member may also be provided with three switch buttons corresponding to the three parking mode, or alternatively, may be designed so that the turning-on/off of the power source and the selection of the parking mode can be performed by a single switch button. The speed sensor 3 calculates a moving speed of the vehicle based on a pulse signal output with the rotation of a shaft of a transmission, or based on a pulse signal output with the rotation of a wheel. A movement distance of the vehicle is calculated based on the moving speed calculated by the speed sensor 3 and a diameter of the wheel. The steering angle sensor 4 detects the steering angle of the steering wheel of the vehicle operated by the driver. The reverse switch 5 detects when the driver has operated the selecting lever to a reverse range to move the vehicle backwards.

The display 6 may be comprised of a liquid crystal panel or of some other display means, capable of being watched by the driver, and may be shared by a navigation system or a television mounted on the vehicle. Various information data for aiding the parking operation conducted by the driver are projected or otherwise displayed on the display 6. The buzzer 7 is mounted to warn the driver for by generating a sound and may include a speaker.

An embodiment of the present invention will be described in more detail with reference to the flow charts shown in FIGS. 3 and 4, taking as an example the aiding of the left backward parking operation (see FIG. 5) in which the vehicle is moved backwards from a backward-movement starting position and parked at a target parking position on the left of the vehicle.

Figure 6:
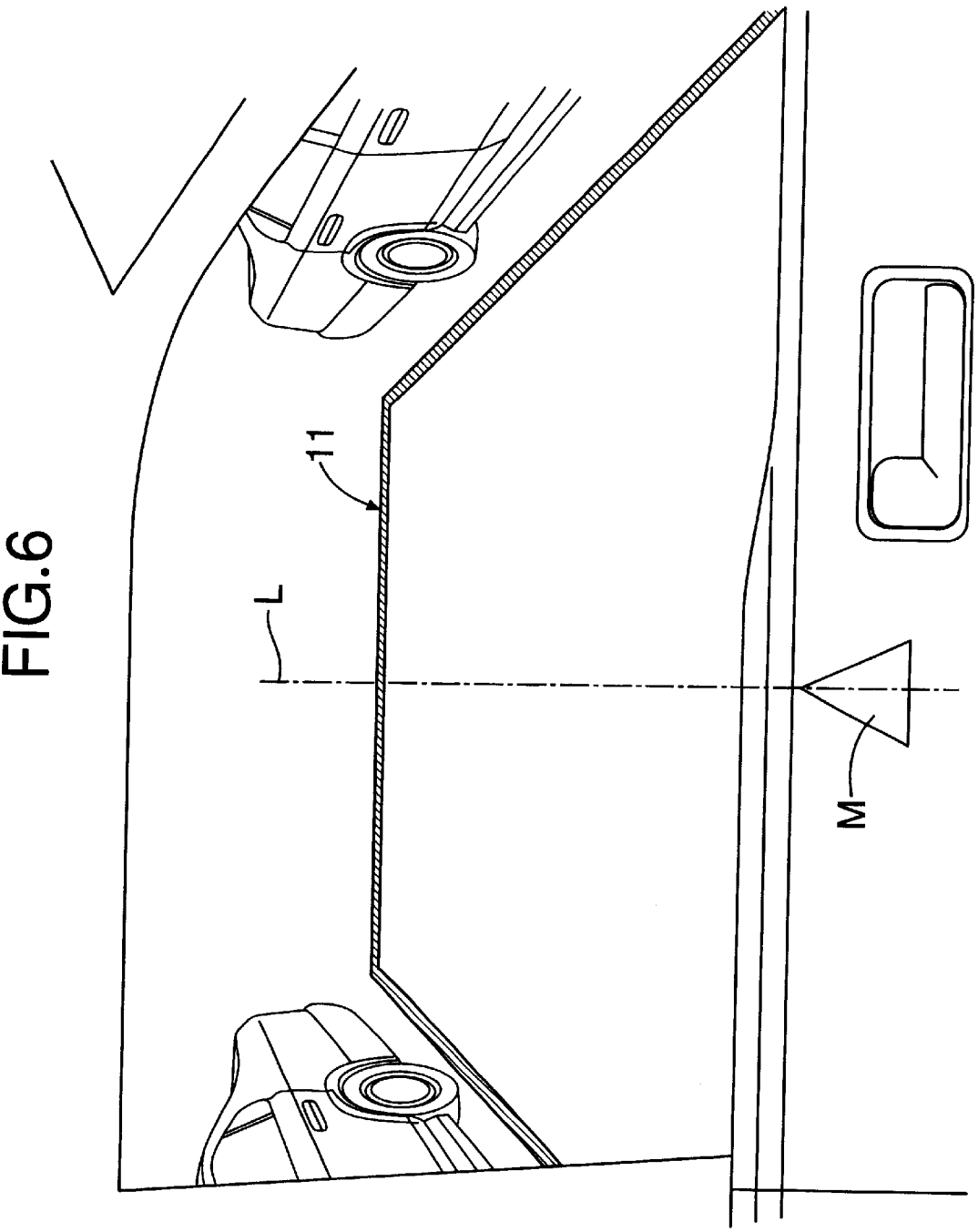
FIG. 6 is an illustration of a parking section as viewed from the inside of a vehicle compartment by a driver.

First, at Step S1, the driver stops the vehicle at a starting position near an entrance of the target parking position as a parking space. FIG. 6 shows a view of the target parking position from the driver's seat at the time when the driver in the vehicle stopped at the starting position. The starting position is such that the left side of the vehicle is spaced apart at a predetermined distance from the entrance of the target parking position; the vehicle is perpendicular to a centerline L of the target parking position, and a mark M provided on the vehicle is matched with a central portion (on the centerline L) of the entrance of the target parking position, as shown in FIG. 6. The mark M may be provided on the inner side of a door, or a door mirror or the like may be utilized as the mark M.

Figure 7:
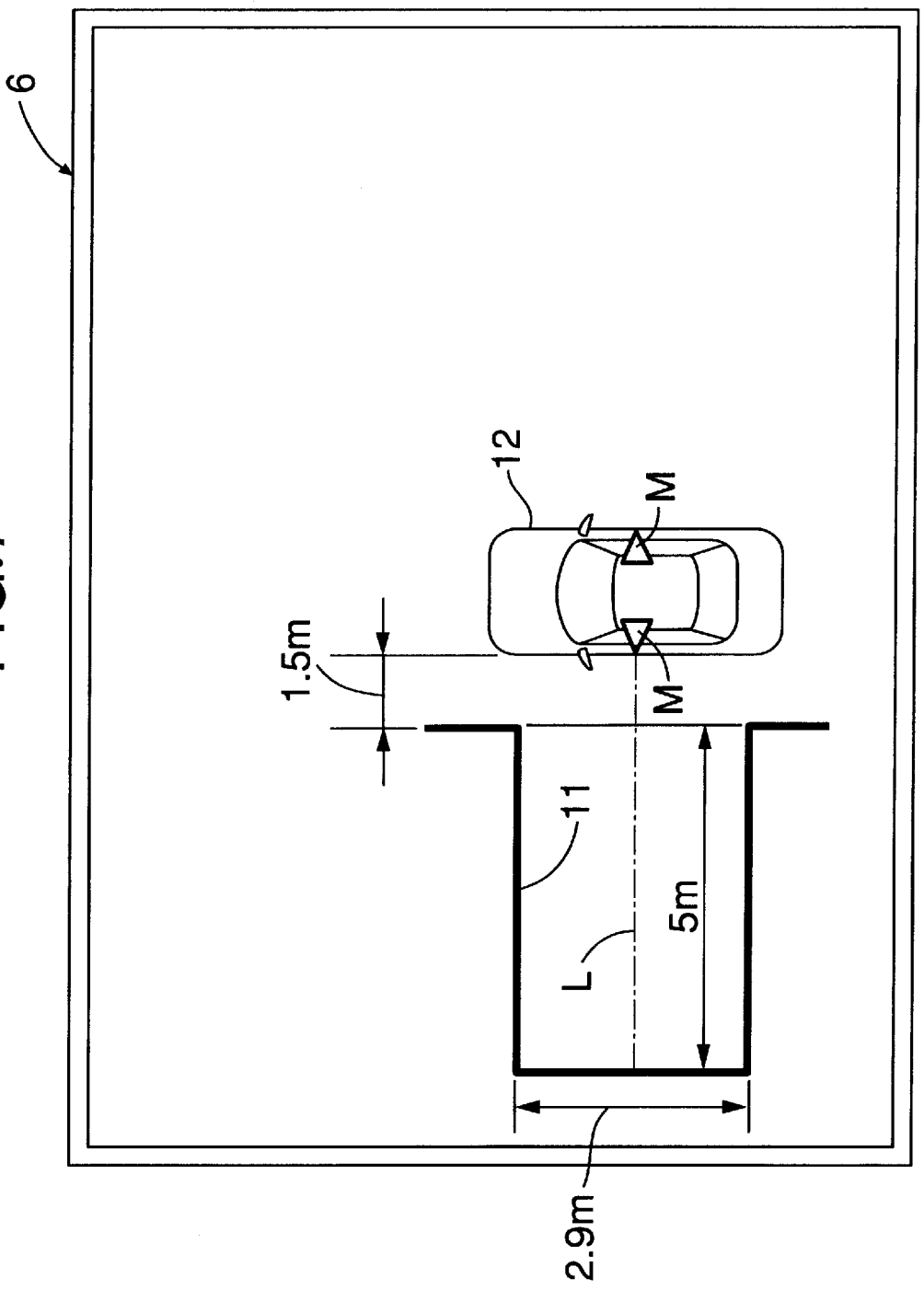
FIGS. 7 to 19 each show the displaying on a display, corresponding to steps of the flow chart.

The driver selects the mode by operating the operating switch 2 at Step S2. Referring also to FIG. 7, a parking section 11 (the target parking position) corresponding to "the left backward parking mode" and a vehicle position 12 are displayed on the display 6. At this time, the parking section 11 is displayed in a state in which the centerline L is matched with the mark M on the vehicle, and an entrance line to the parking section 11 and the left side of the vehicle are parallel to each other and 1.5 m spaced apart from each other. In this case, the width of the parking section 11 is displayed as 2.9 m, and the depth of the parking section 11 is displayed as 5 m, even though the space may be larger. For reliably judging that the vehicle does not contact with other vehicles parked on opposite sides of the parking section 11, it is desirable that the width of the parking section 11 is displayed as the smallest width parking spot which might be encountered, such as that defined by local Law. Therefore, the displayed width will not be larger than the actual width. It is rare to encounter a parking section having the smallest width. Therefore, the size of the parking section can be set as described above as the compromise between the reliability of the judgment of the contact and the know-how of use.

Even if the actual position of the vehicle deviates from the correct starting position in FIG. 7, the vehicle position 12 on the display 6 may be displayed at the correct starting position. For this reason, the actual position of the vehicle and the vehicle position on the display may not match each other and hence, the subsequent parking operation aiding operation may not be carried out. Therefore, in order to enable the appropriate parking operation aiding operation, the driver should stop the vehicle at the correct starting position as shown in FIG. 6. Thus, the vehicle may be stopped at the correct starting position by detecting the white line or the other parked vehicles using a sensor such as a camera, radar, sonar and the like, or by receiving data for the size of the parking section 11 and the other parked vehicles from a transmitter mounted in the parking section 11.

Figure 8:
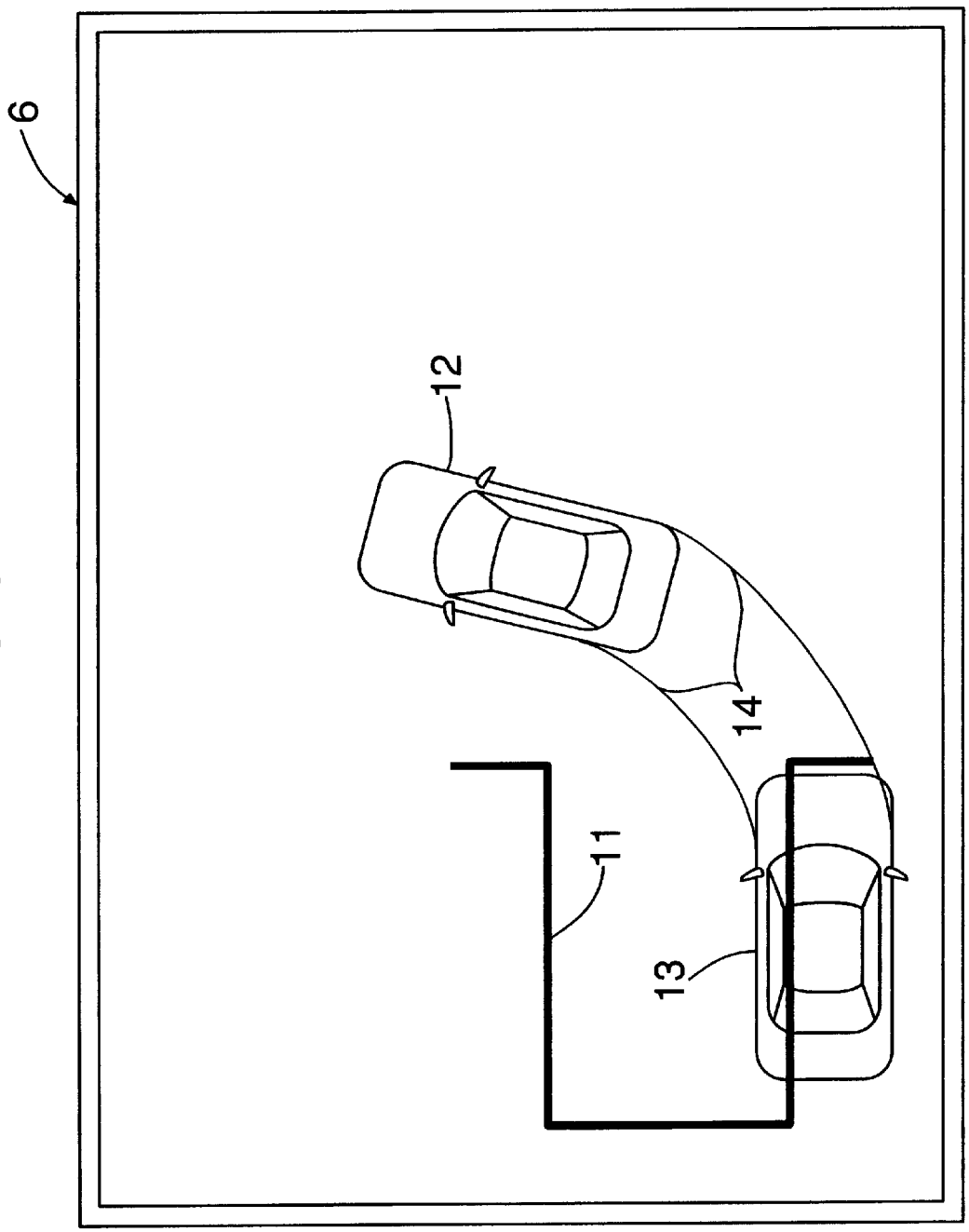

At subsequent Step S3, a message, such as "move the vehicle forward until an expected parking position is matched with the parking section" or the like, may be displayed on the display 6, or the message may be read to the driver by voice, such as from a speaker. When the driver moves the vehicle forwards in response to that message, the parking section 11, the vehicle position 12, the expected parking position 13 and an expected moving locus 14 are displayed on the display 6, as shown in FIG. 8. The parking section 11, the vehicle position 12, the expected parking position 13 and the expected moving locus 14 on the display 6 are varied with the movement of the vehicle. The expected parking position 13 displayed at that time is the position if the vehicle were to be moved from its current vehicle position with the steering wheel turned counterclockwise to a largest steering angle until becoming parallel to the parking section, and then moved backwards simultaneously while the steering wheel returned to a neutral position, until the front end of the vehicle has passed the entrance line of the parking section 11. The expected moving locus 14 is a locus of movement of rear wheels, but may be based on the front wheels.

By displaying the expected parking position 13 for a backward movement of the vehicle based on the largest steering angle on the display 6 in the above manner, the driver can know a minimum amount of forward movement of the vehicle required to guide the vehicle to the parking section 11. In addition, by displaying the expected locus 14 of movement of the rear wheels on the display 6, the driver can refer to this information to move the vehicle forward to a position where it does not interfere with the parking section 11 during backward movement of the vehicle. That is, the driver can move the vehicle forward until the expected parking position 13 is within parking section 11 and expected moving locus 14 does not intersect parking section 11.

Figure 22A:
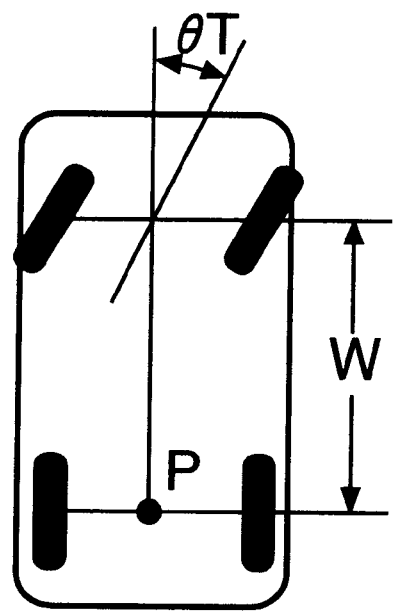
FIGS. 22A and 22B are illustrations for explaining a four-wheel vehicle model and a two-wheel vehicle model.
Figure 22B:
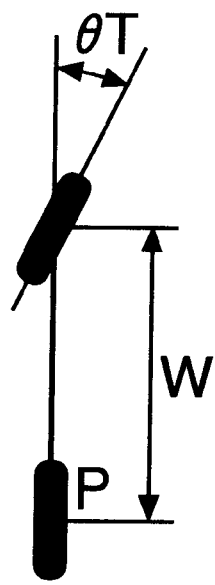

During the forward movement of the vehicle, the controller 1 calculates a position and an inclination of the vehicle based on a signal from the moving speed sensor 3 and a signal from the steering angle sensor 4. Methods for calculating a vehicle position $P_n$ ($X_n$, $Y_n$) and an inclination $\beta_n$ of the vehicle are described below. The sign of the steering angle $\theta$ is defined as "+" when the vehicle is steered clockwise, and as "−" when the vehicle is steered counterclockwise for the purposes of these calculations. A turning angle $\theta T$ of the front wheels may be calculated by multiplying a steering angle $\theta$ by the steering gear ratio of the vehicle. In the present embodiment, a model of a four-wheel vehicle shown in FIG. 22A is replaced by a model of a two-wheel vehicle shown in FIG. 22B for purpose of simplifying the calculation.

Figure 23A:
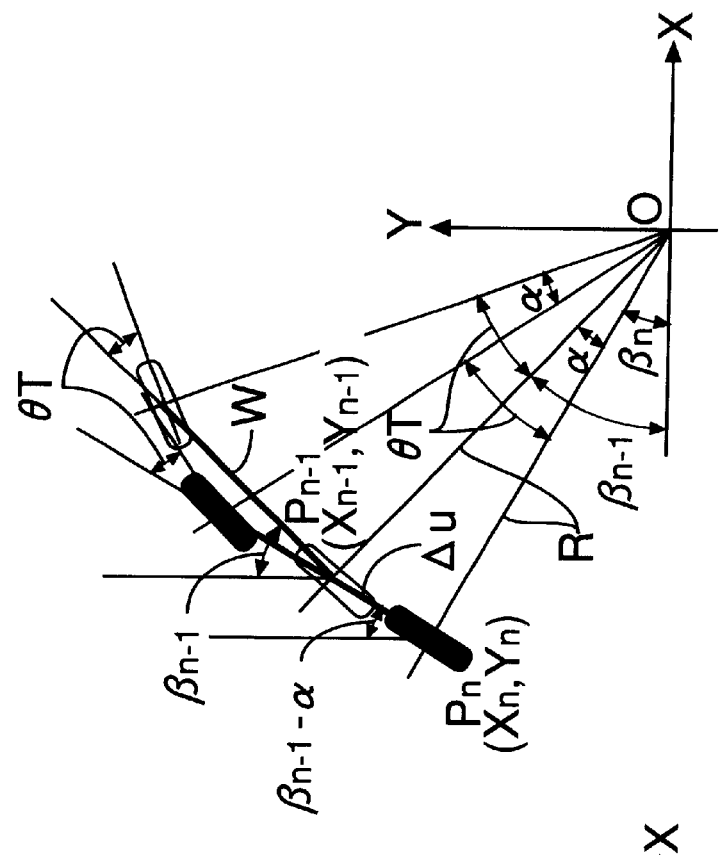
FIGS. 23A and 23B are diagrams for explaining the relationship between the distance of movement of the vehicle and the inclination of the vehicle.

An inclination of the vehicle with respect to a Y-axis is supposed as being $\beta_{n-1}$ in a vehicle position $P_{n-1}$ ($X_{n-1}$, $Y_{n-1}$) shown in FIG. 23A. It is supposed that the vehicle has been moved forwards from the vehicle position $P_{n-1}$ at the turning angle $\theta T$ of the front wheels through a distance corresponding to one count of a pulse signal output based on a distance of movement of the vehicle to reach a vehicle position $P_n$ ($X_n$, $Y_n$). In this case, if the distance of movement from the vehicle position $P_{n-1}$ to the vehicle position $P_n$ is represented by $\Delta u$, and a turning radius is represented by R (=W/tan $\theta T$), the inclination of the vehicle is increased by $\alpha$ (=$\Delta u$/R) to become equal to $\beta_n$ (=$\beta_{n-1}$+$\alpha$). Therefore, if the coordinates ($X_n$, $Y_n$) of the vehicle position $P_n$ are represented by the coordinates ($X_{n-1}$, $Y_{n-1}$) of the vehicle position $P_{n-1}$, the following equations are given:

$$X_n = X_{n-1} + (R \cos \beta_{n-1} - R \cos(\beta_{n-1}+\alpha))$$

$$= X_{n-1} + R(\cos \beta_{n-1} - \cos(\beta_{n-1}+\alpha));$$

$$Y_n = Y_{n-1} + (R \sin(\beta_{n-1}+\alpha) - R \sin \beta_{n-1})$$

$$= Y_{n-1} + R(\sin(\beta_{n-1}+\alpha) - \sin \beta_{n-1})$$

The movement distance calculated based on the output from the moving speed sensor 3 is a distance of movement of the outer front wheel as viewed during turning movement of the vehicle if the vehicle is a front wheel-drive vehicle, and is the distance of movement of the outer rear wheel as viewed during turning movement of the vehicle, if the vehicle is a rear wheel-drove vehicle. The reason that, in general, a vehicle speed sensor detects the rotation of the transmission shaft rather than the rotation of the wheel itself. However, an inner wheel turned at a smaller radius during turning movement of the vehicle, i.e., moved through a smaller distance, is decelerated in rotation by a differential gear, and therefore, the rotation of the wheel cannot be detected accurately by a vehicle speed sensor.

When a wheel speed sensor mounted on each of the wheels is utilized as the moving speed sensor 3, the wheel speed sensor can calculate the distance of movement of any wheel having the wheel speed sensor mounted thereon.

Therefore, for example, when the distance of movement of the outer front wheel is detected based on the output from the moving speed sensor 3, if the distance of movement per count is represented by $\Delta S$ and the radius of turning movement of the outer wheel is represented by Rfo, the inclination $\alpha$ upon movement of the vehicle by one count can be calculated from $\alpha = \Delta S/Rfo$. When the distance of movement of the inner front wheel is detected based on the output from the moving speed sensor 3, if the distance of movement per count is represented by $\Delta S$ and the radius of turning movement of the inner wheel is represented by Rfi, the inclination $\alpha$ upon movement of the vehicle by one count can be calculated from $\alpha = \Delta S/Rfi$. When the distance of movement of the outer rear wheel is detected based on the output from the moving speed sensor 3, if the distance of movement per count is represented by $\Delta S$ and the radius of turning movement of the outer wheel is represented by Rro, the inclination $\alpha$ upon movement of the vehicle by one count can be calculated from $\alpha = \Delta S/Rro$. When the distance of movement of the inner rear wheel is detected based on the output from the moving speed sensor 3, if the distance of movement per count is represented by $\Delta S$ and the radius of turning movement of the inner wheel is represented by Rri, the inclination $\alpha$ upon movement of the vehicle by one count can be calculated from $\alpha = \Delta S/Rri$.

Figure 24:
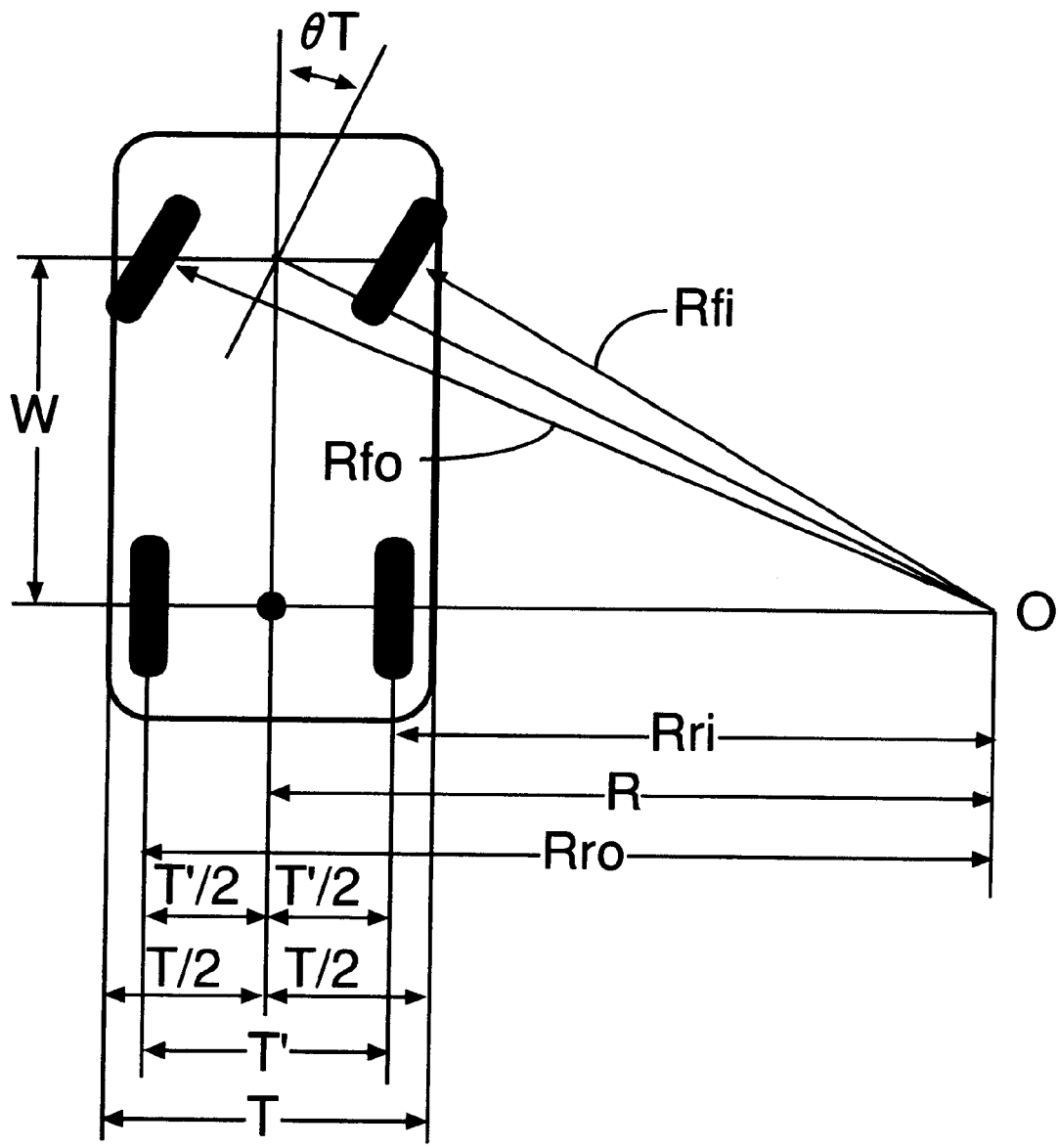
FIG. 24 is a diagram for explaining the turning radii of four wheels.

As shown in FIG. 24, if a distance between the left and right wheels is represented by T', a radius Rro of turning movement of the outer rear wheel can be represented by the equation:

$$Rro = R + T'/2,$$

and a radius Rri of turning movement of the inner rear wheel can be represented by the equation:

$$Rri = R - T'/2.$$

In addition, a radius Rfo of turning movement of the outer front wheel can be represented by the equation:

$$Rfo = (W^2 + Rro^2)^{1/2},$$

and a radius Rfi of turning movement of the inner front wheel can be represented by the equation:

$$Rfi = (W^2 + Rri^2)^{1/2}.$$

When the vehicle speed sensor of a front wheel-drive vehicle is used as the moving speed sensor 3 on the basis of the forgoing, if the coordinates of the position $P_n$ of the vehicle after being moved are represented by the coordinates ($X_{n-1}$, $Y_{n-1}$) of the position $P_{n-1}$ of the vehicle before being moved, the following equations can represent the relationships shown in FIG. 23A:

$$X_n = X_{n-1} + \Delta x$$

$$= X_{n-1} + R(\cos \beta_{n-1} - \cos(\beta_{n-1}+\alpha))$$

$$= X_{n-1} + (W/\tan \theta T)(\cos \beta_{n-1} - \cos(\beta_{n-1}+\alpha));$$

$$Y_n = Y_{n-1} + \Delta y$$

$$= Y_{n-1} + R(\sin(\beta_{n-1}+\alpha) - \sin \beta_{n-1})$$

$$= Y_{n-1} + (W/\tan \theta T)(\sin(\beta_{n-1}+\alpha) - \sin \beta_{n-1}); \text{ and}$$

$$\alpha = \Delta S/Rfo$$

$$= \Delta S/(W^2 + Rro^2)^{1/2}$$

$$= \Delta S/(W^2 + (W/\tan \theta T + T'/2)^2)^{1/2}.$$

An amount $\Delta x$ of variation in point on the X-axis of the coordinates and an amount $\Delta y$ of variation in point on the Y-axis of the coordinates can be calculated in every count of the pulse signal, and values resulting from addition of the amounts Δx and Δy of variation to the coordinates ($X_{n-1}$, $Y_{n-1}$) of the current vehicle position $P_{n-1}$ can be rewritten as a new vehicle position $P_{n-1}$. In this manner, the vehicle position $P_n$ can be calculated sequentially. In this case, the value $β_{n-1}+α$, which is the inclination of the vehicle, is rewritten to a new inclination $β_{n-1}$. In the starting position, $β=0$ and hence, $β$ is set at 0 in an initial processing.

Figure 23B:
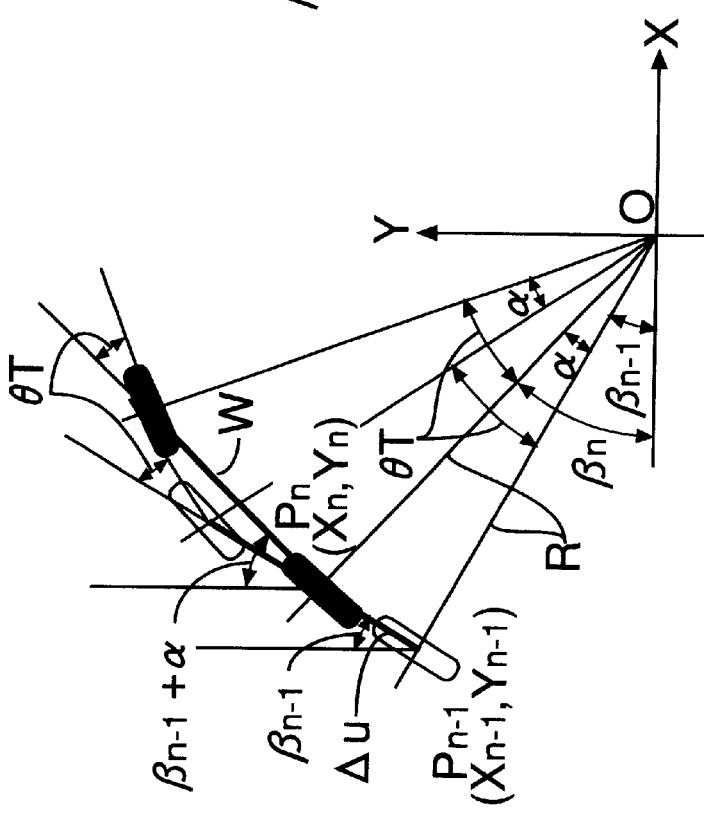

The calculation of the vehicle position $P_n$ during backward movement of the vehicle will be described below. For a point of view similar to that for the calculation of the vehicle position $P_n$ in the forward movement of the vehicle, the following equations are provided with reference to FIG. 23B:

$$X_n = X_{n-1} + (R \cos β_{n-1} - R \cos(β_{n-1} - α))$$
$$= X_{n-1} + R(\cos β_{n-1} - \cos (β_{n-1} - α)); \text{ and}$$
$$Y_n = Y_{n-1} + (R \sin(β_{n-1} - α) - R \sin β_{n-1})$$
$$= Y_{n-1} + R(\sin(β_{n-1} - α) - \sin β_{n-1}).$$

Thus, it can be seen that the value a in the forward movement may be set at $-α$. Therefore, the coordinates of the vehicle position $P_{n-1}$ is represented by ($X_{n-1}$, $Y_{n-1}$), and the variation amounts Δx and Δy can be calculated each time the vehicle is moved backwards through the distance corresponding to one count. Coordinates (X+Δx, Y+Δy) resulting from addition of Δx and Δy to the vehicle position $P_{n-1}$ ($X_{n-1}$, $Y_{n-1}$) can be rewritten as a new vehicle position $P_{n-1}$ ($X_{n-1}$, $Y_{n-1}$). In this manner, the vehicle position $P_n$ can be calculated. In this case, the inclination $β_{n-1}-α$ of the vehicle is also rewritten to $β_{n-1}$.

Figure 3:
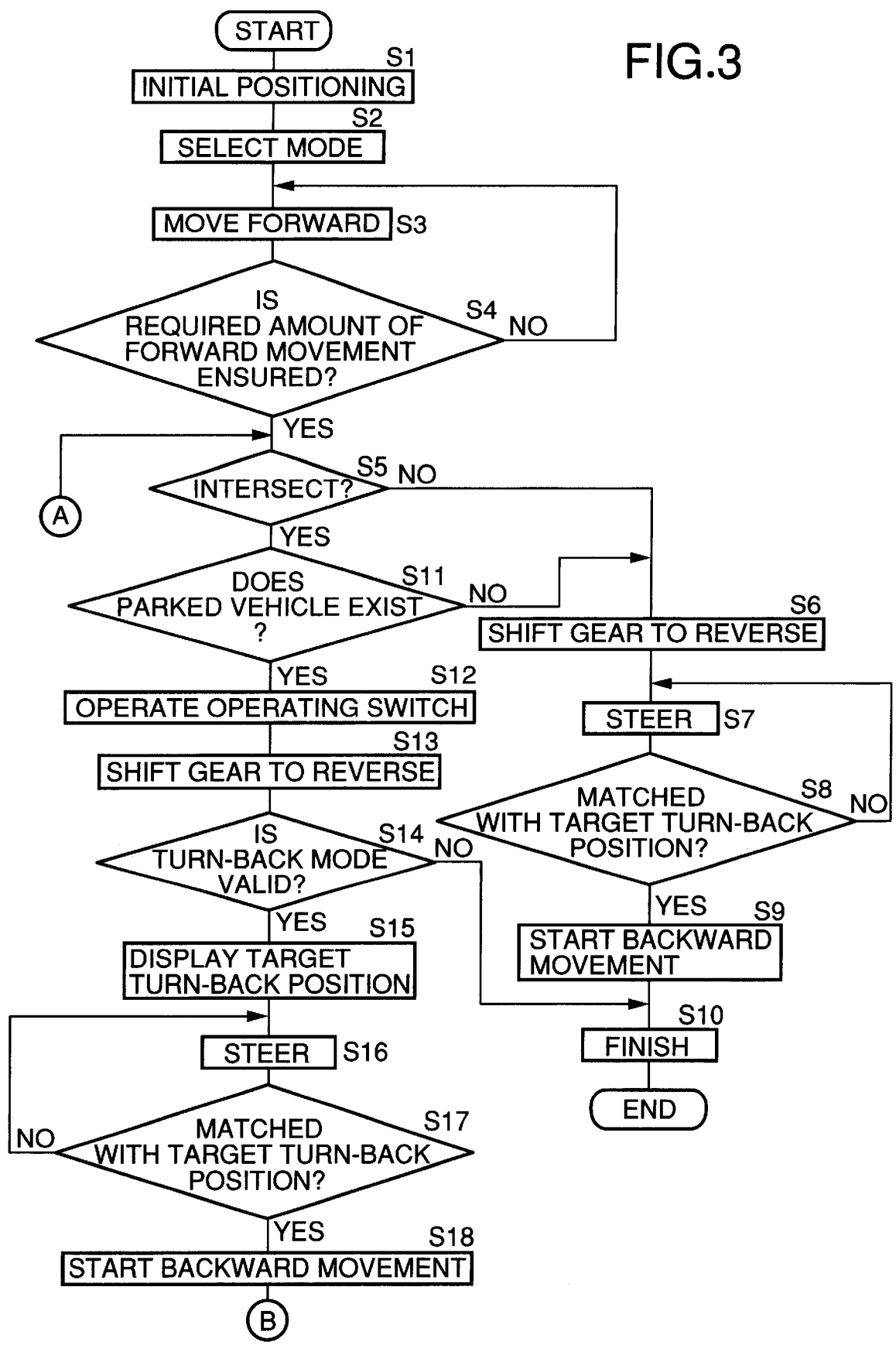
FIG. 3 is a first section of a flow chart for aiding parking operation according to the present.
Figure 9:
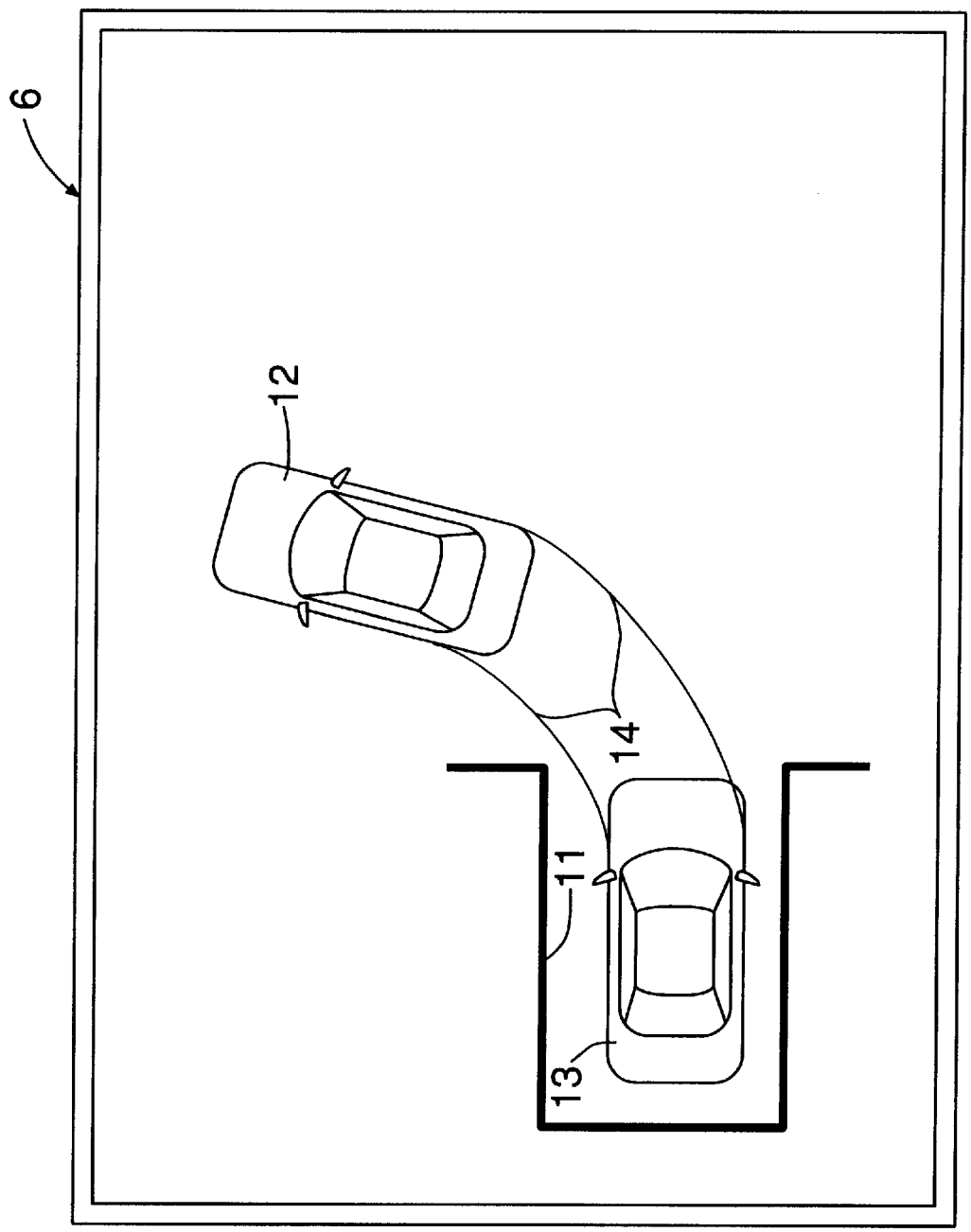

Returning to the flow chart shown in FIG. 3, when the vehicle is moved forward at Step S3, the expected parking position 13 can be matched with the parking section 11, as shown in FIG. 9, and then, the buzzer 7 can be operated to indicate the message "Stop the vehicle," which may also be displayed on the display 6 or sounded by voice. As a result, it can be ensured that the vehicle is moved the amount forward required at the minimum to guide the vehicle to the parking section 11 at Step S4. If the message is provided by the buzzer 7 or by voice, such as by a speaker, before the expected parking position is matched with the parking section 11, or if the volume, the pitch or the like of the voice sound is changed with the movement of the vehicle, the overrunning of the vehicle can be prevented. Thus, the vehicle can be reliably stopped in a state in which the expected parking position has been matched with the parking section 11.

Figure 20:
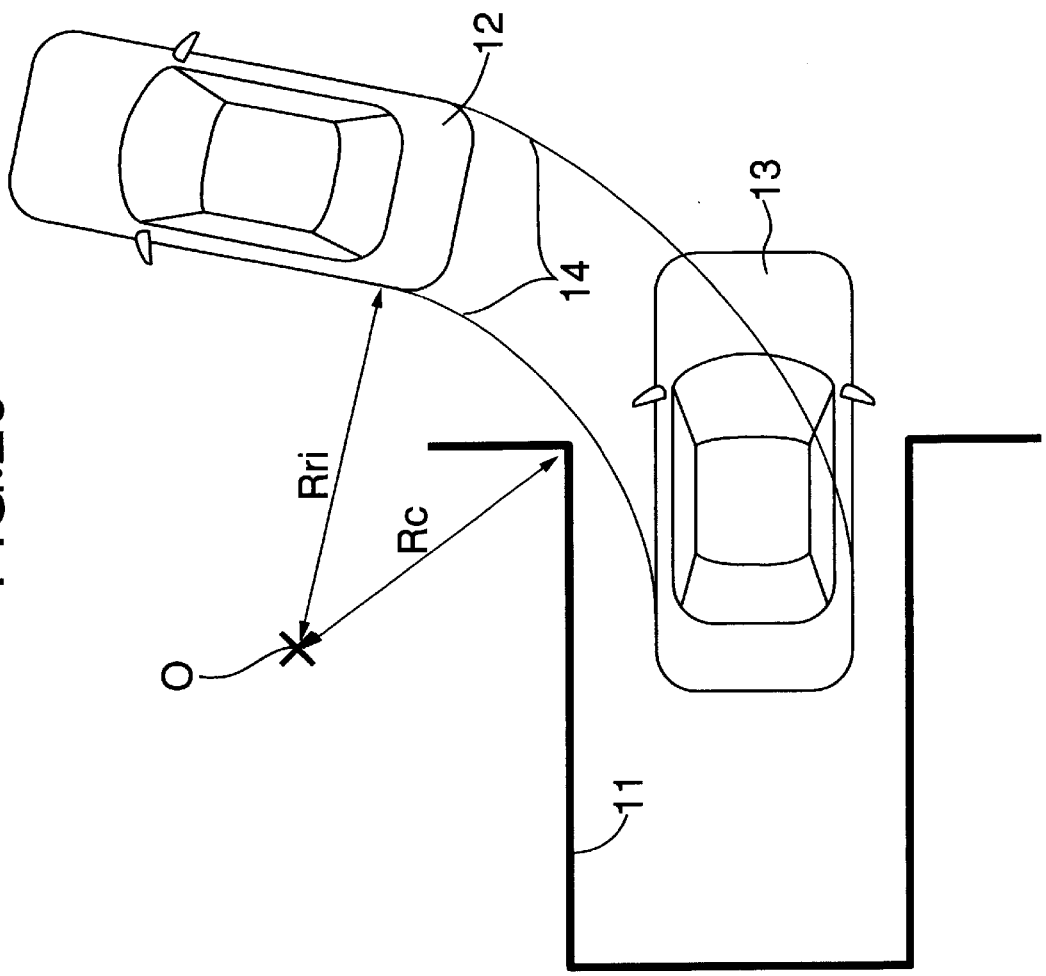
FIG. 20 is an illustration for explaining a technique for determining the intersection of an expected movement locus and the parking section.

At Step S5, it is determined whether the expected movement locus 14 for the vehicle will intersect a corner of the parking section 11, such as the inner corner, as viewed in a turning direction. For example, referring to FIG. 20, if a distance Rc from the center O of the turning movement of the vehicle to such inner corner of the parking section as viewed in the turning direction is equal to or larger than the radius Rri of turning movement of inner one of the rear wheels as viewed during the turning movement of the vehicle, then it is determined that the expected movement locus 14 will intersect the inner corner. On the other hand, if the distance Rc is smaller than the turning radius Ri, then it is determined that the expected movement locus 14 will not intersect the inner corner.

If it is determined at Step S5 that the expected movement locus 14 will not intersect the inner corner processing proceeds to Step S6. At Step S6, a message such as, "shift the gear to a reverse gear" are provided by displaying on the display 6 or by voice. When it is detected by the reverse switch 5 that the driver has shifted the gear into reverse, the displaying on the display 6 can be changed to that shown in FIG. 10, and then a message such as, "turn the steering wheel until a target vehicle is matched with the parking section" or the like is similarly provided. In the figures, the target vehicle 13' and the expected movement locus 14 displayed on the display 6 are those calculated at the time point as if the vehicle were moving backwards based on the current steering angle, until the vehicle is moved backwards while the steering wheel turned to the neutral position until the front end of the vehicle has passed the entrance line of the parking section 11. The expected parking position 13 corresponds to the vehicle position 12 at the time point when the vehicle will have been moved backwards based on the largest steering angle, while the target vehicle 13' corresponds to the vehicle position 12 at the time point when the vehicle will have been moved backwards at the actual, current steering angle at that time.

Figure 10:
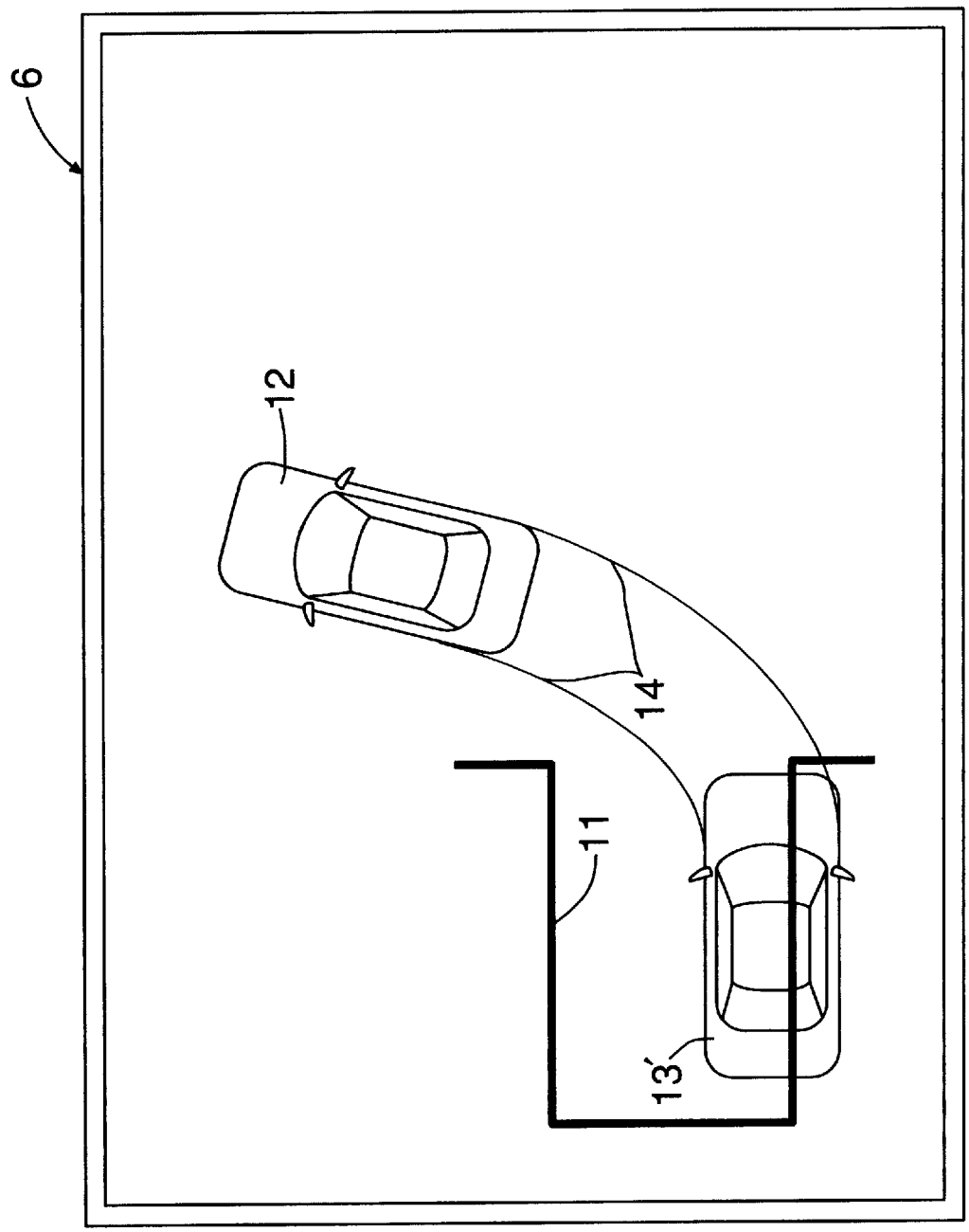

When the displaying on the display 6 is changed from the state shown in FIG. 9 corresponding to the largest steering angle to the state shown in FIG. 10 corresponding to the actual steering angle, the driver can recognize the target vehicle 13' and the expected movement locus 14 move reliably if they are in a different displayed color (for example, a blue color) than the expected parking position 13 and its corresponding movement locus 14, which may be, for example, red. Alternatively, the type of a line displayed (a solid line, a broken line, a dashed line, the thickness of a line and the like) may be changed in place of or in addition to changing of the displayed color.

Figure 11:
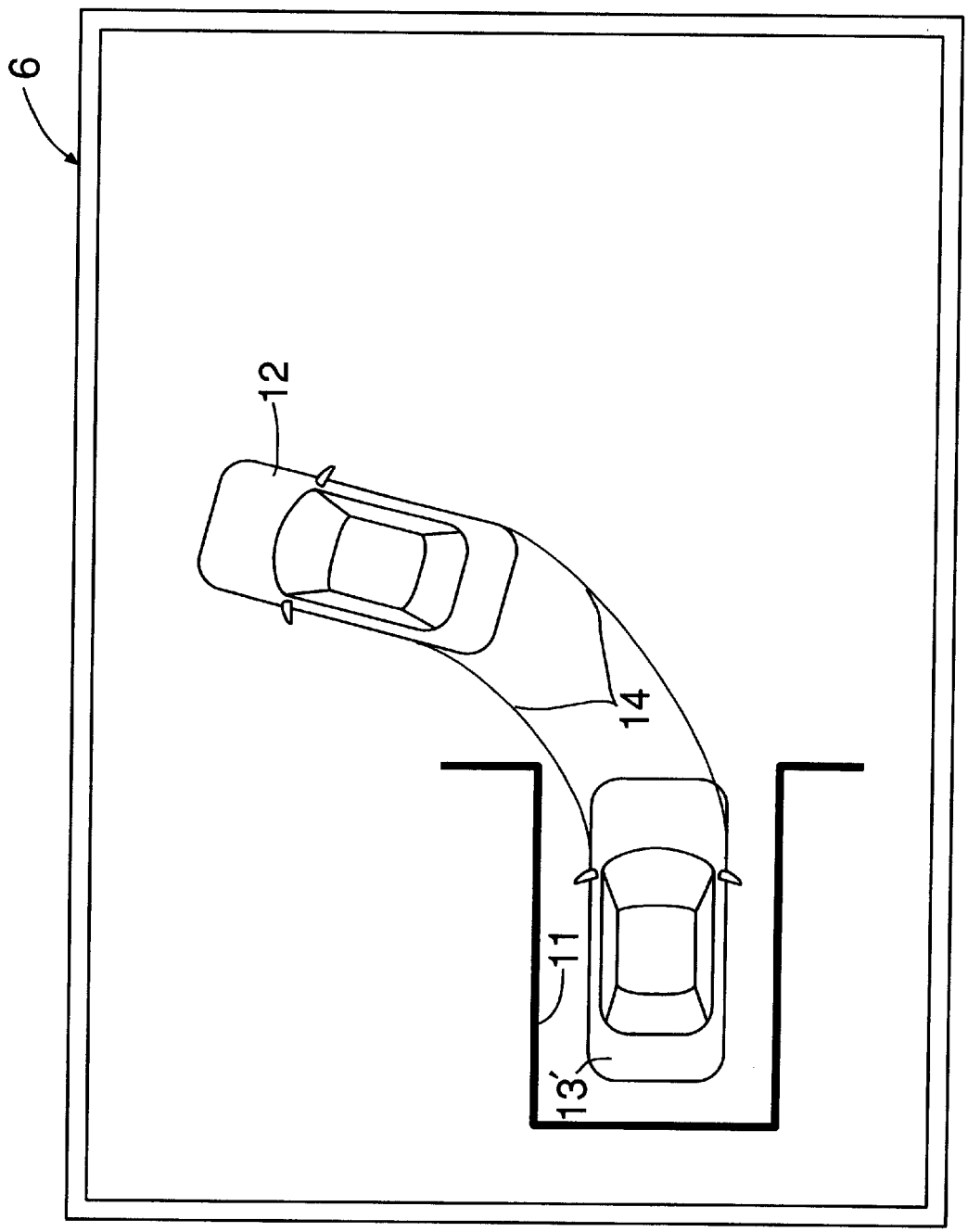

When the driver operates the steering wheel based on the above teaching at Step S7, the target vehicle 13' and the expected movement locus 14 displayed on the display 6 are changed in accordance with the current steering angle. When the target vehicle 13' is housed in the parking section 11 at Step S8, as shown in FIG. 11, a message such as, "move the vehicle backwards, while bewaring of the surroundings" or the like, can be provided by the displaying on the display 6 or by voice. At Step S9, the driver moves the vehicle backwards in accordance with the message, and when this movement is confirmed by the output from the moving speed sensor 3, the parking operation aiding control operation is terminated at Step S10.

Therefore, the driver can park the vehicle in the parking section 11 by moving the vehicle backwards at the current actual steering angle until it is parallel to the parking section 11, and then returning the steering wheel to the neutral position and moving the vehicle backwards until the front end thereof passes the entrance line of the parking section 11. One of the reasons why the parking operation aiding control operation can be terminated at the time point when the vehicle starts the backward movement is to allow the driver to concentrate on the surroundings. Also, the vehicle might be guided reliably to the parking section 11 only by the fine regulation of the steering angle, except for special cases, such as a case where the starting position has been deviated extremely, or a case where the actual parking section 11 is extremely narrow. If an image taken in the rear of the vehicle by a camera is displayed on the display 6 after finishing the parking operation aiding control operation, or if the driver is notified of an approaching situation of a surrounding object detected by a sonar or radar, it is possible to effectively assist in the safety confirmation of the driver.

Figure 12A:
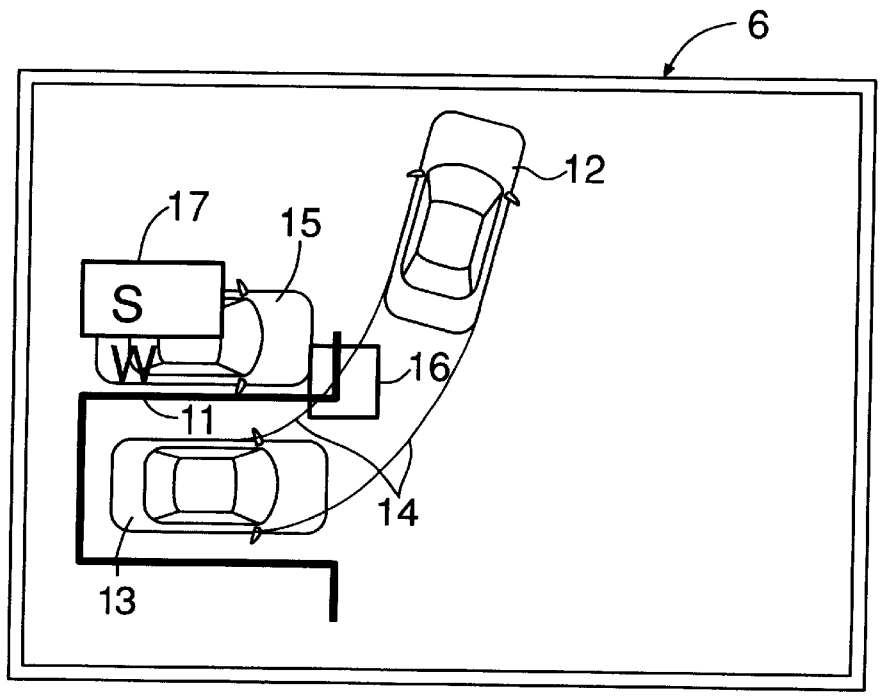
Figure 12B:
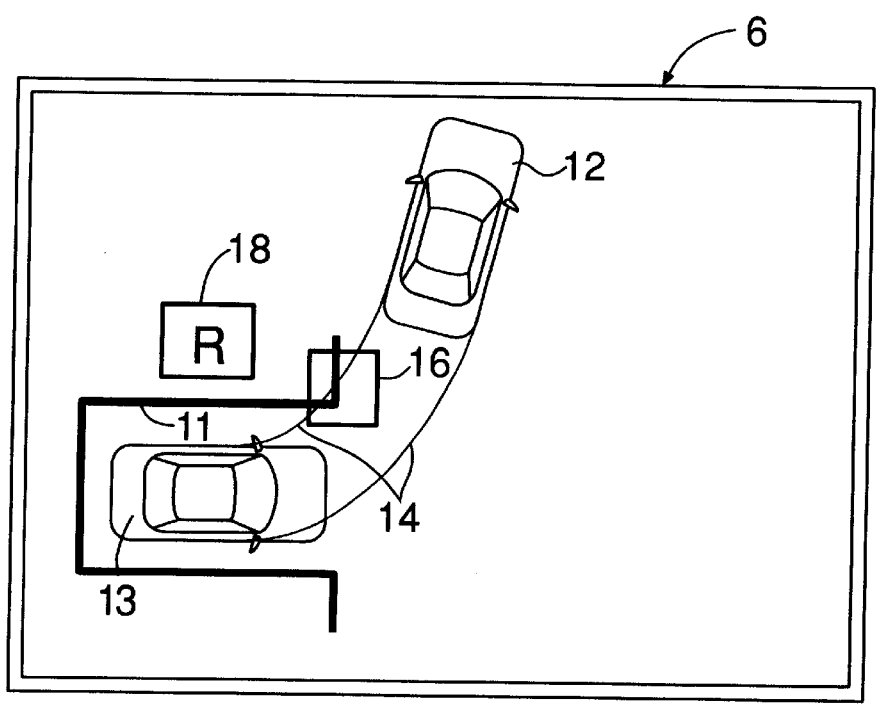

If it is determined at Step S5 that the expected movement locus 14 for the vehicle will intersect the inner corner of the parking section 11 as viewed in the turning movement, an image shown in FIG. 12A and an image shown in FIG. 12B may be alternately displayed on the display 6. The image shown in FIG. 12A corresponds to a case where a parked vehicle 15 exists in a parking section adjoining a left side of the parking section 11. In this case, a corner mark 16 is displayed which is indicative that the expected movement locus 14 will intersect the inner corner of the parking section as viewed in the turning direction, and a switch-operating command mark 17 for requesting or forcing the driver to operate the operating switch 2 is also displayed. In addition, a message such as, "there is a possibility of contact of the vehicle with a parked vehicle inner as viewed in the turning direction" or the like, may be displayed on the display 6 or sounded by voice. The image shown in FIG. 12B corresponds to a case where no parked vehicle exists in a parking section adjoining the left side of the parking section 11. In this case, the corner mark 16 is displayed which is indicative of that the expected movement locus 14 will intersect the inner corner of the parking section as viewed in the turning direction, and a reverse shifting command mark 18 is also displayed for requesting or forcing the driver to operate the selecting lever to the reverse range. In addition, a message such as, "shift the gear to the reverse gear if there is no possibility of contact of the vehicle with a parked vehicle inner as viewed in the turning direction" or the like, may be displayed on the display 6 or sounded by voice.

The driver visually confirms whether or not a parked vehicle exists inside the vehicle as viewed in the turning direction of the vehicle, at Step S11. If no parked vehicle exists inside the vehicle as viewed in the turning direction of the vehicle, the processing is passed to Steps S6 to S10, whereby the vehicle is moved backwards and parked in the parking section 11 as in the case where the expected movement locus 14 will not intersect the inner corner of the parking section 11 as viewed in the turning direction. In this case, even if the movement locus for the vehicle intersects the inner corner of the parking section 11 as viewed in the turning direction, there is no interference because no parked vehicle exists.

Figure 13:
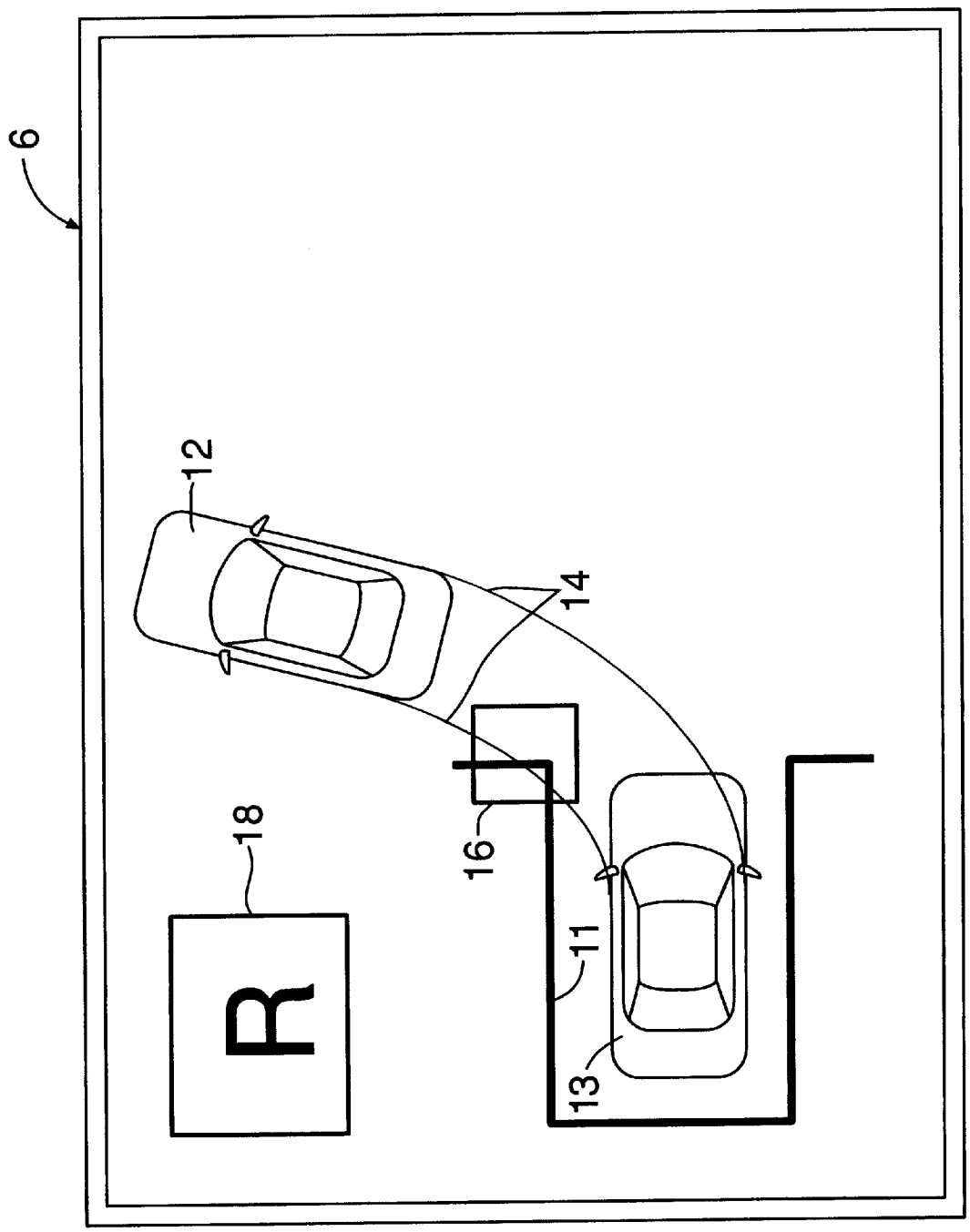

If a parked vehicle exists inside the vehicle as viewed in the turning direction of the vehicle at Step S11, the driver operates the operating switch 2 at Step S12 to select the turn-back mode (a mode in which the vehicle is moved forward in the middle of the backward parking operation toward the parking section 11, thereby changing the position of the turning center). When the turn-back mode is selected, a message such as, "shift the gear to the reverse gear" or the like, may be displayed on the display 6 or sounded by voice at Step S13. The displaying on the display 6 is changed to that shown in FIG. 13. Namely, the corner mark 16 indicative of that the expected movement locus 14 will intersect the inner corner of the parking section 11 as viewed in the turning direction and the reverse shifting command mark 18 for requesting that the driver operate the selecting lever to the reverse range are displayed on the display 6.

Figure 21B:
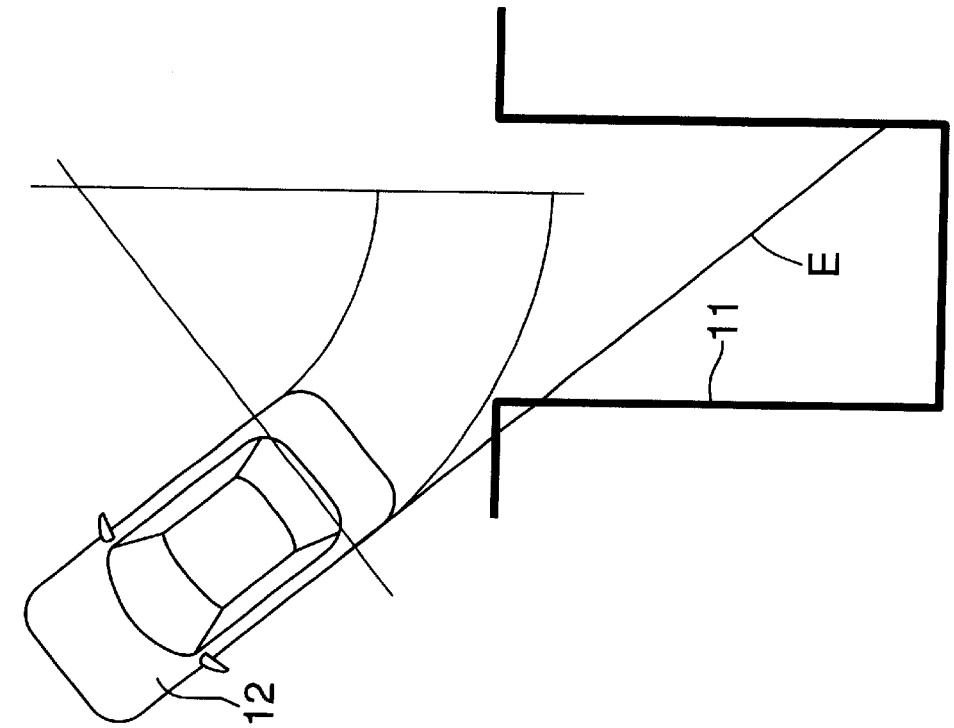
FIGS. 21A and 21B are illustrations for explaining a technique for determining the validity of a turn-back mode.
Figure 21A:
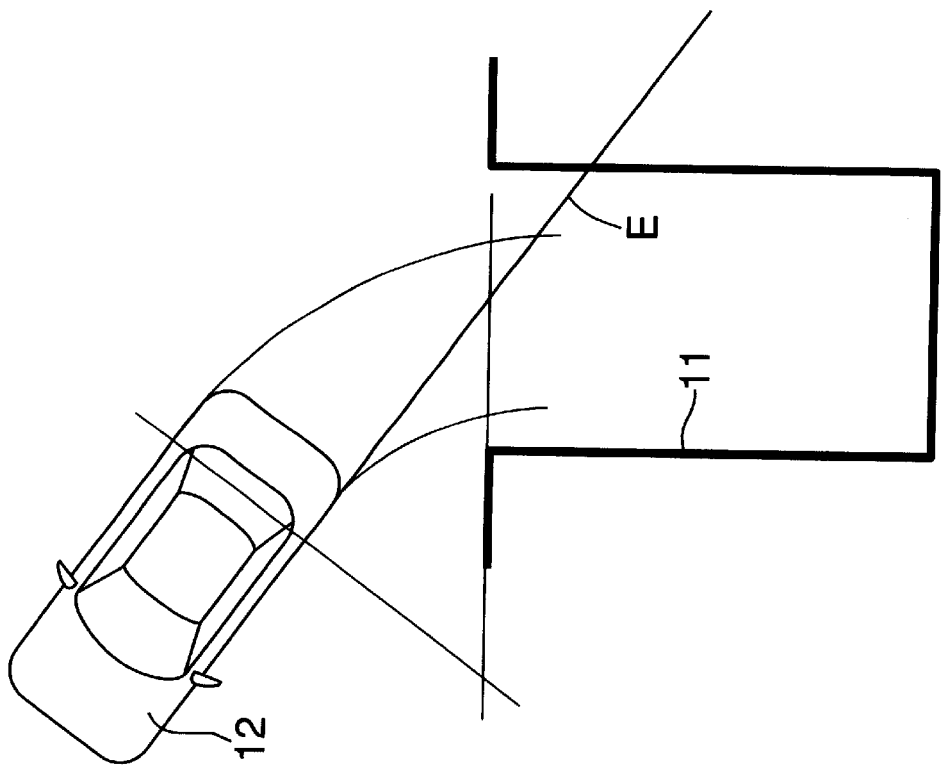

At subsequent Step S14, it is determined whether the parking operation in the turn-back mode is valid. More specifically, as shown in FIG. 21A, if an extension line E from an inner side of the vehicle as viewed in the turning direction exists inside the inner corner of the parking section 11 as viewed in the turning direction, it is determined that the parking operation in the turn-back mode is valid. If the extension line E exists outside the inner corner of the parking section 11 as viewed in the turning direction, as shown in FIG. 21B, it is determined that the parking operation in the turn-back mode is invalid. The reason, in the case shown in FIG. 21B, to move the vehicle clear of the inner corner of the parking section 11 as viewed in the turning direction, the steering wheel must be operated clockwise. However, the backward movement of the vehicle with the steering wheel operated clockwise is largely the same as the returning movement to the starting position —even if a target turn-back position is calculated and the vehicle is moved backwards to the turn-back position. Therefore, in the case shown in FIG. 21B, a message such as, "restart the operation from the beginning" or the like, can be displayed on the display 6 or sounded by voice, and the parking operation aiding control operation is terminated at Step S10, and restarted by the driver.

Figure 14:
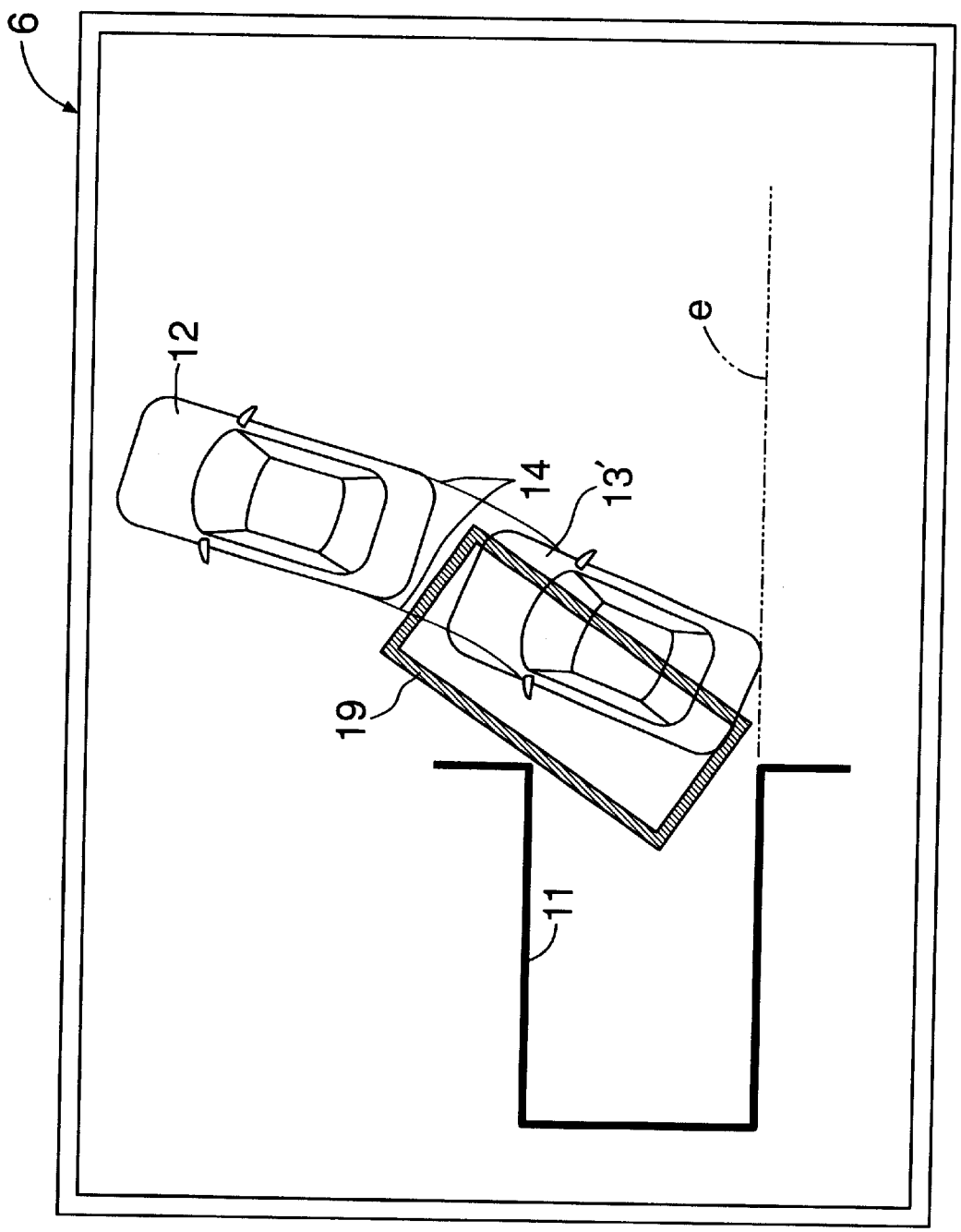

If the parking operation in the turn-back is determined to be valid in Step S14, then the vehicle position 12, the target vehicle 13' and the expected movement locus 14 corresponding to the current actual steering angle, and a target turn-back position 19 are displayed on the display 6, as shown in FIG. 14. The target turn-back position 19 is a position for guiding the vehicle to the parking section 11, while avoiding the interference with the inner corner of the parking section 11 as viewed in the turning direction. The target turn-back position 19 is displayed as a position at a time point when a rear end of the vehicle has reached an extension line e from an outer side of the parking section 11 as viewed in the turning direction, when the vehicle, during backward movement, has passed externally near the inner corner of the parking section.

Figure 15:
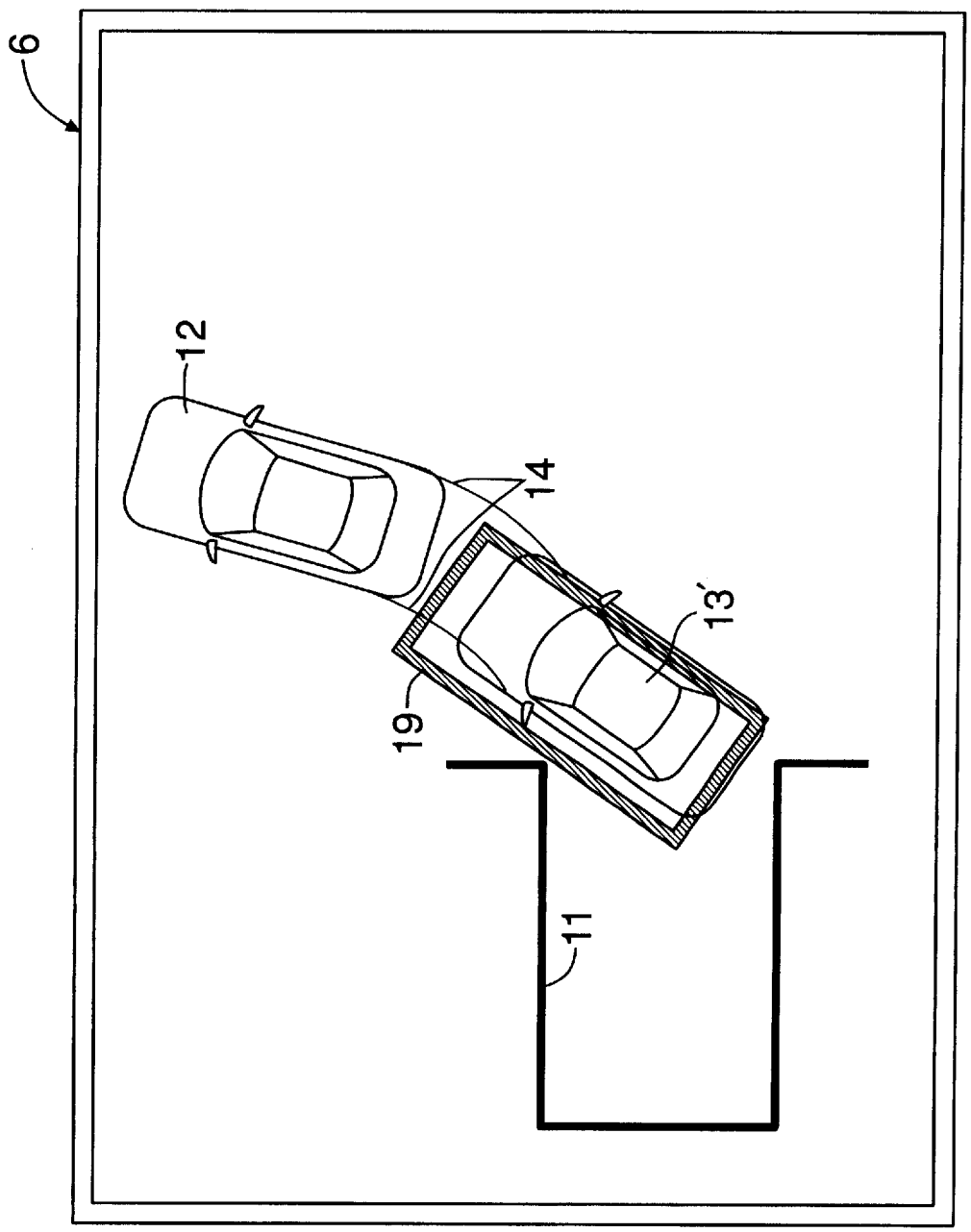

At subsequent Step S16, the driver operates the steering wheel, and at Step S17, the target vehicle 13' corresponding to the actual steering angle is matched with the target turn-back position 19, such as shown in FIG. 15. If such operation is conducted, a message such as, "move the vehicle backwards, while bewaring of the surroundings" or the like, may be displayed on the display 6 or sounded by voice. At Step S18, the backward movement of the vehicle is started with the steering angle remaining maintained. When the starting of the backward movement of the vehicle is detected by the moving speed sensor 3, a message such as, "shift the gear to a drive gear," may be displayed on the display or sounded by voice when the vehicle is about to come into contact with the surroundings.

Figure 4:
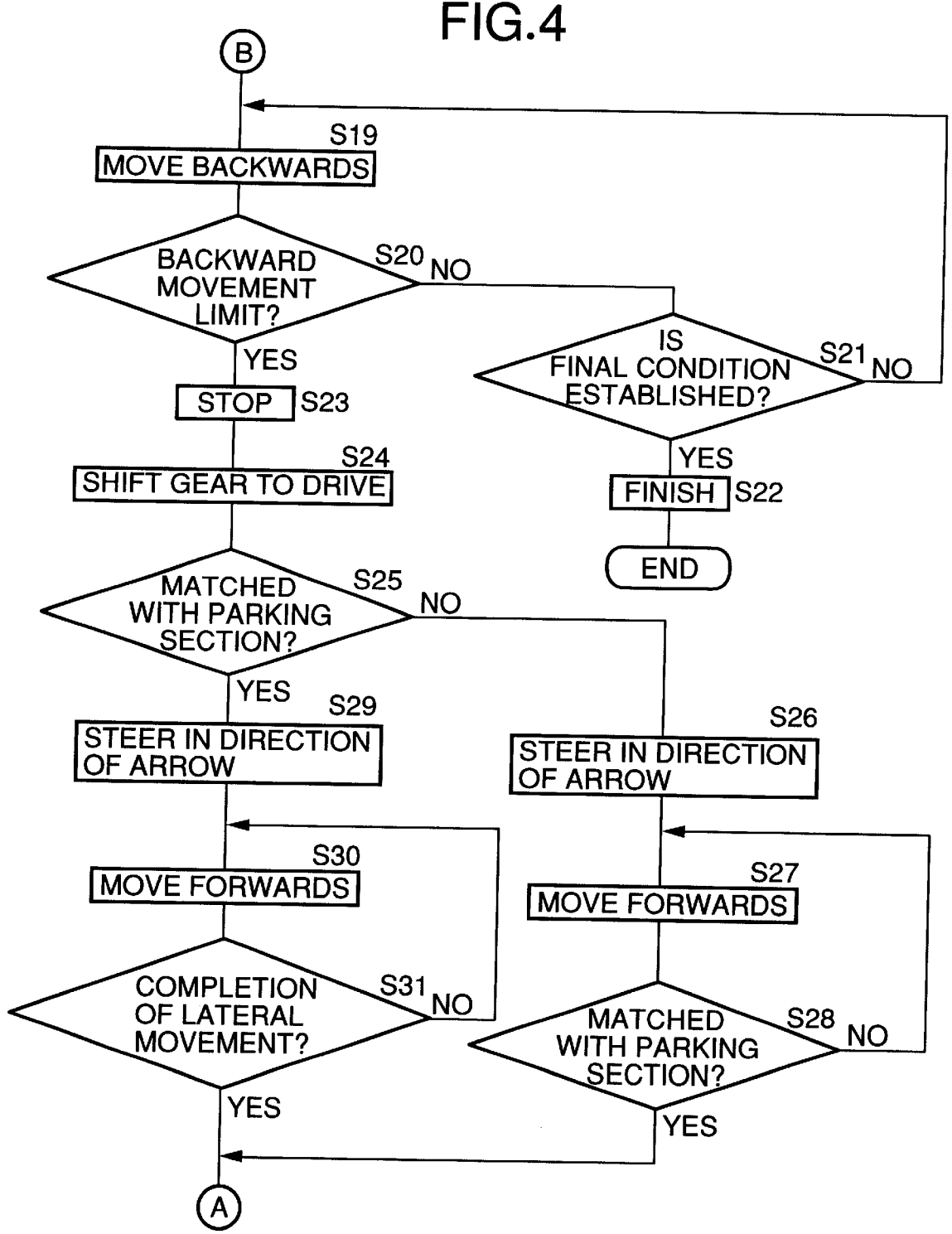
FIG. 4 is a second section of the flow chart of FIG. 3.
Figure 5:
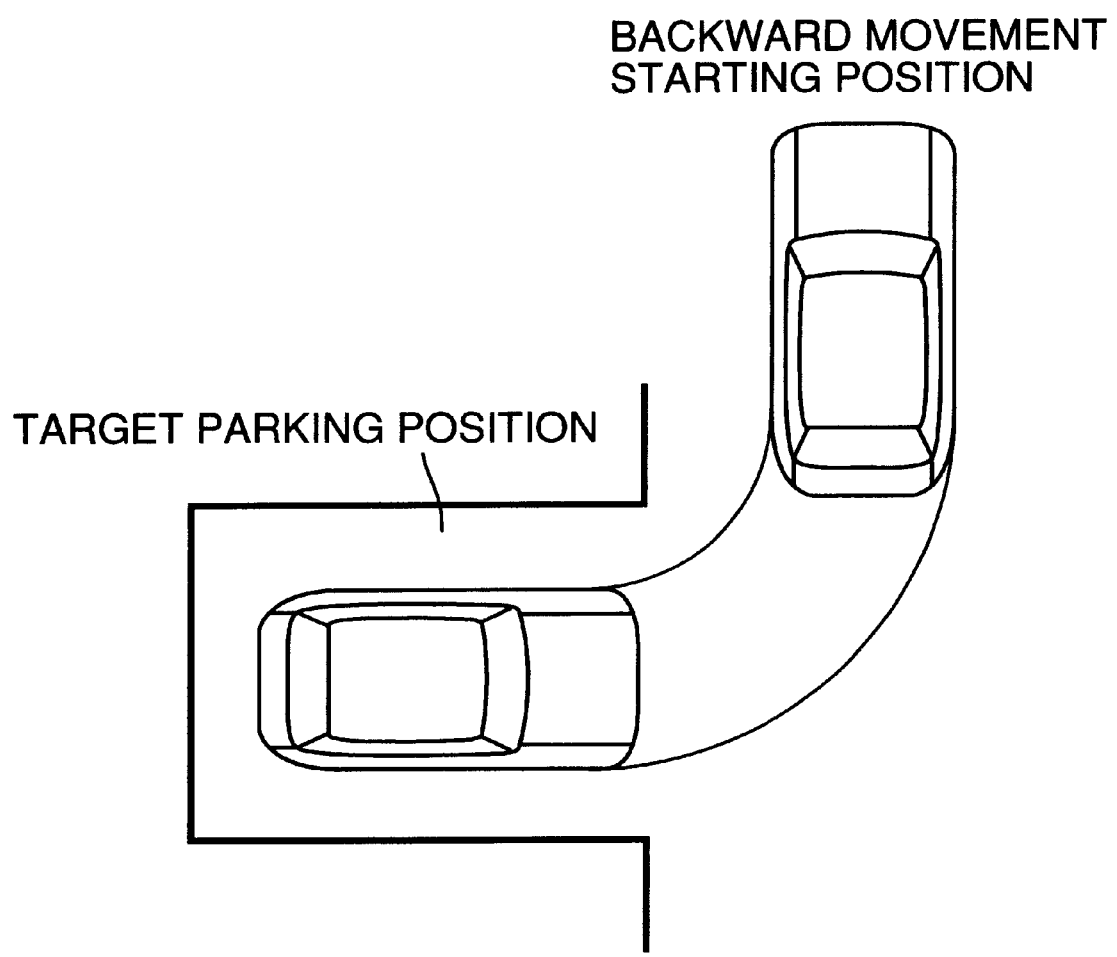
FIG. 5 is an illustration for explaining a left backward parking operation.

Referring to FIG. 4, while the vehicle is being moved backwards at Step S19, the driver determines at Step S20 whether the vehicle has reached a backward movement limit, namely, a limit position where the vehicle will make contact with another object if the backward movement is continued. If a final condition is established at Step S21 before the vehicle reaches the backward movement limit at Step S20, it is determined that the parking operation has been completed, whereby the parking operation aiding control operation is finished at Step S22. The final condition may be, for example, that the inclination of the vehicle is parallel to the parking section 11, and that a predetermined time has been lapsed after the gear position has become a parking position.

Figure 16:
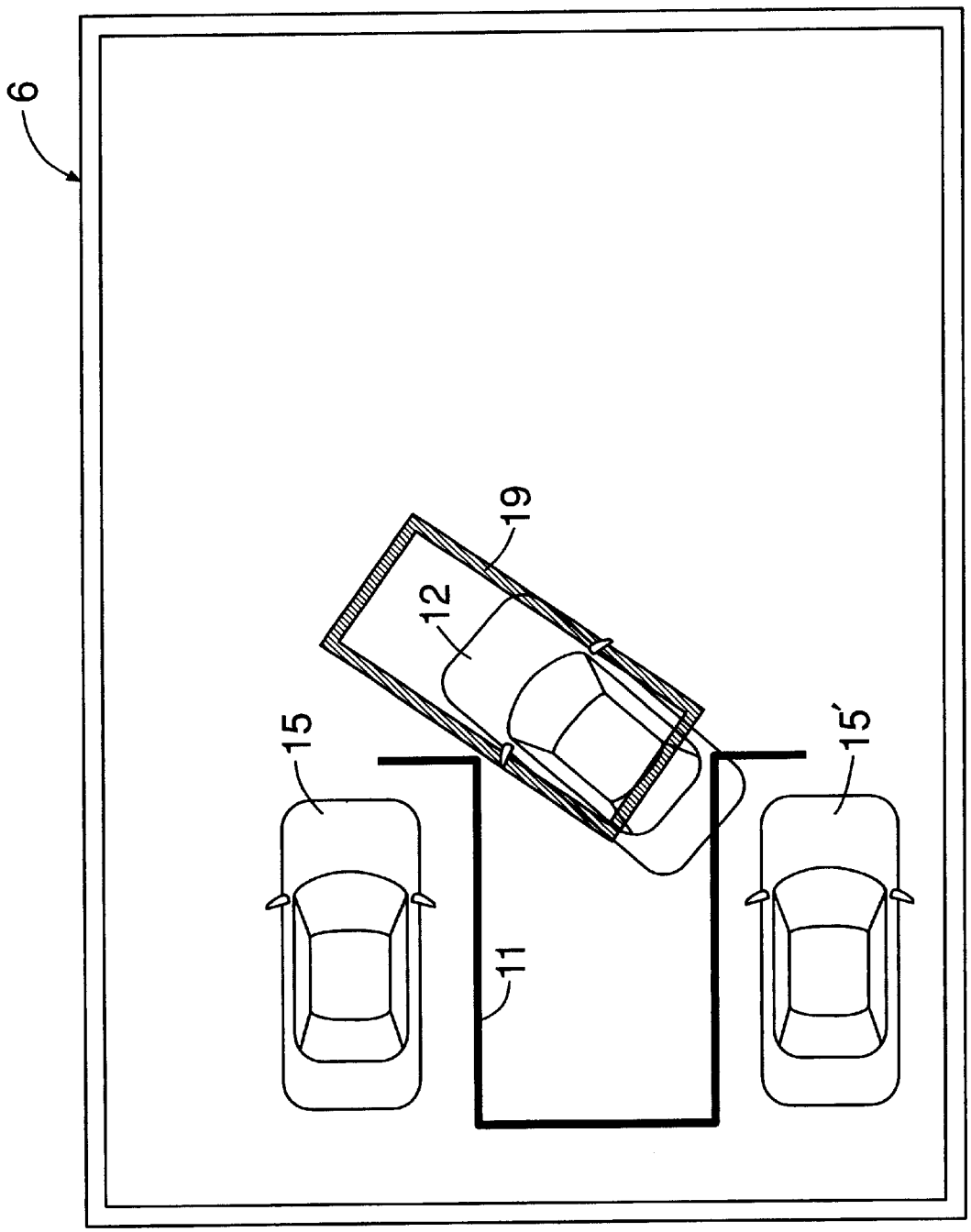

An image may be taken in the rear of the vehicle by a camera to be displayed, or the driver may be informed of an approaching situation of a surrounding object detected by radar or sonar during the backward movement of the vehicle to the backward movement limit to effectively assist in the driver's confirmation of the backward movement limit and in the driver's safety confirmation. FIG. 16 shows a state in which the vehicle has been stopped at the backward movement limit. In FIG. 16, the vehicle has been stopped beyond the target turn-back position 19, but this is because there is a spatial margin existing between the corner of the parking section 11 and a parked vehicle 15'.

Figure 17:
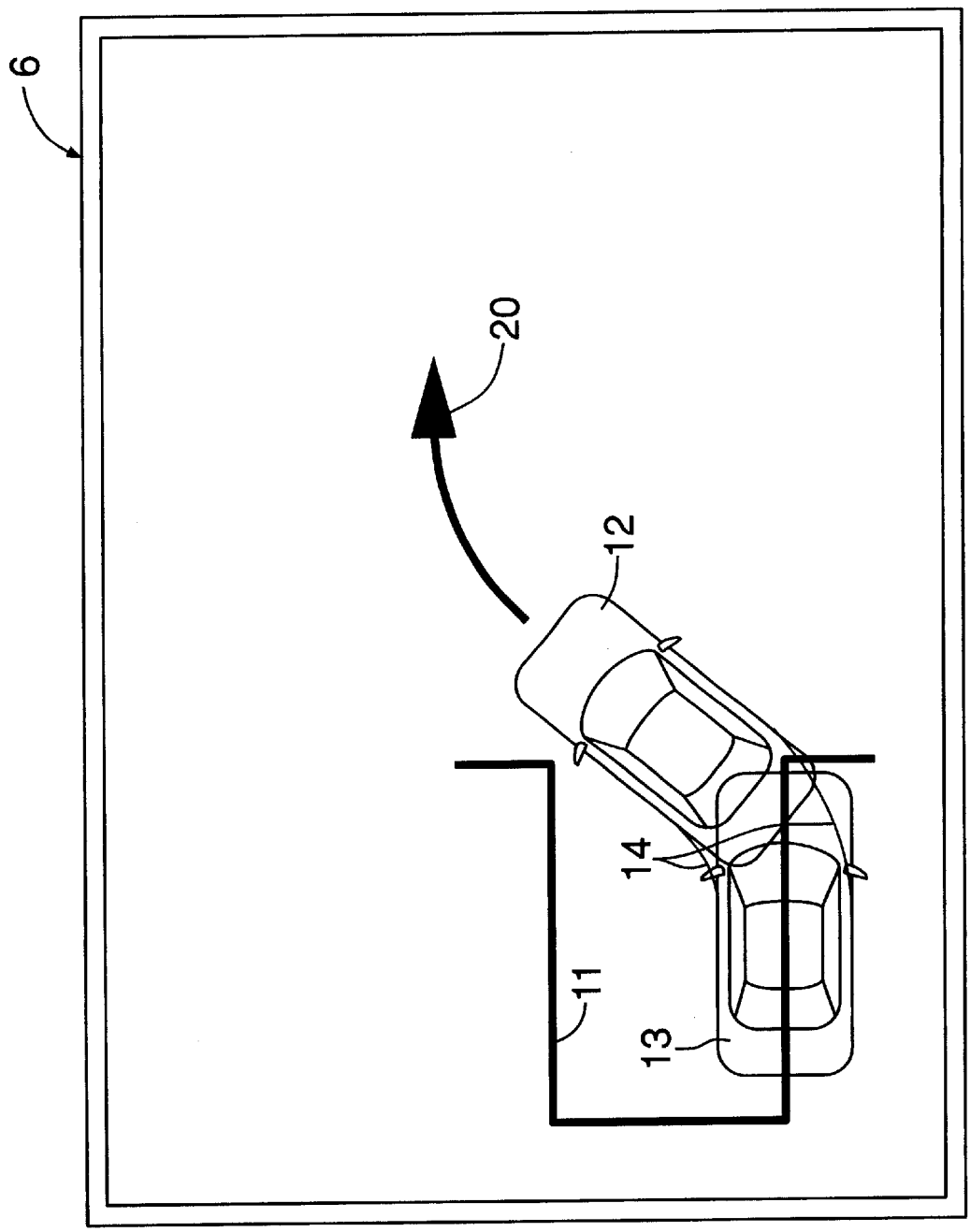

When the vehicle is stopped at the backward movement limit at Step S23 and the driver shifts the gear to the drive gear at Step S24, the displaying on the display may be changed to that shown in FIG. 17. The parking section 11, the vehicle position 12, an expected parking position 13, an expected movement locus 14 and an arrow 20 are displayed on the display 6. The arrow 20 indicates a direction to guide the vehicle in the forward movement. The expected parking position 13 indicates a state in which the vehicle has been moved backwards based on the largest steering angle to become parallel to the parking section 11, and then moved backwards with the steering wheel returned to the neutral position until the front end of the vehicle has passed the entrance line of the parking section. The expected movement locus 14 indicates a locus of movement of the rear wheels at that time.

When the displaying on the display 6 is changed to that shown in FIG. 17, if the expected parking position 13 is not housed in the parking section 11 at Step S25, a message such as, "move the vehicle forwards in the direction of the arrow, whereby the expected parking position is matched with the parking section 11" or the like, may be displayed on the display 6 or sounded by voice. If the driver operates the steering wheel in the direction of the arrow 20 at Step S26 and moves the vehicle forwards at Step S27, whereby the expected parking position is matched with the parking section 11 at Step 28, the parking operation can be completed by returning the processing to the Step S5 and repeating the parking operation aiding control operation again.

Figure 18:
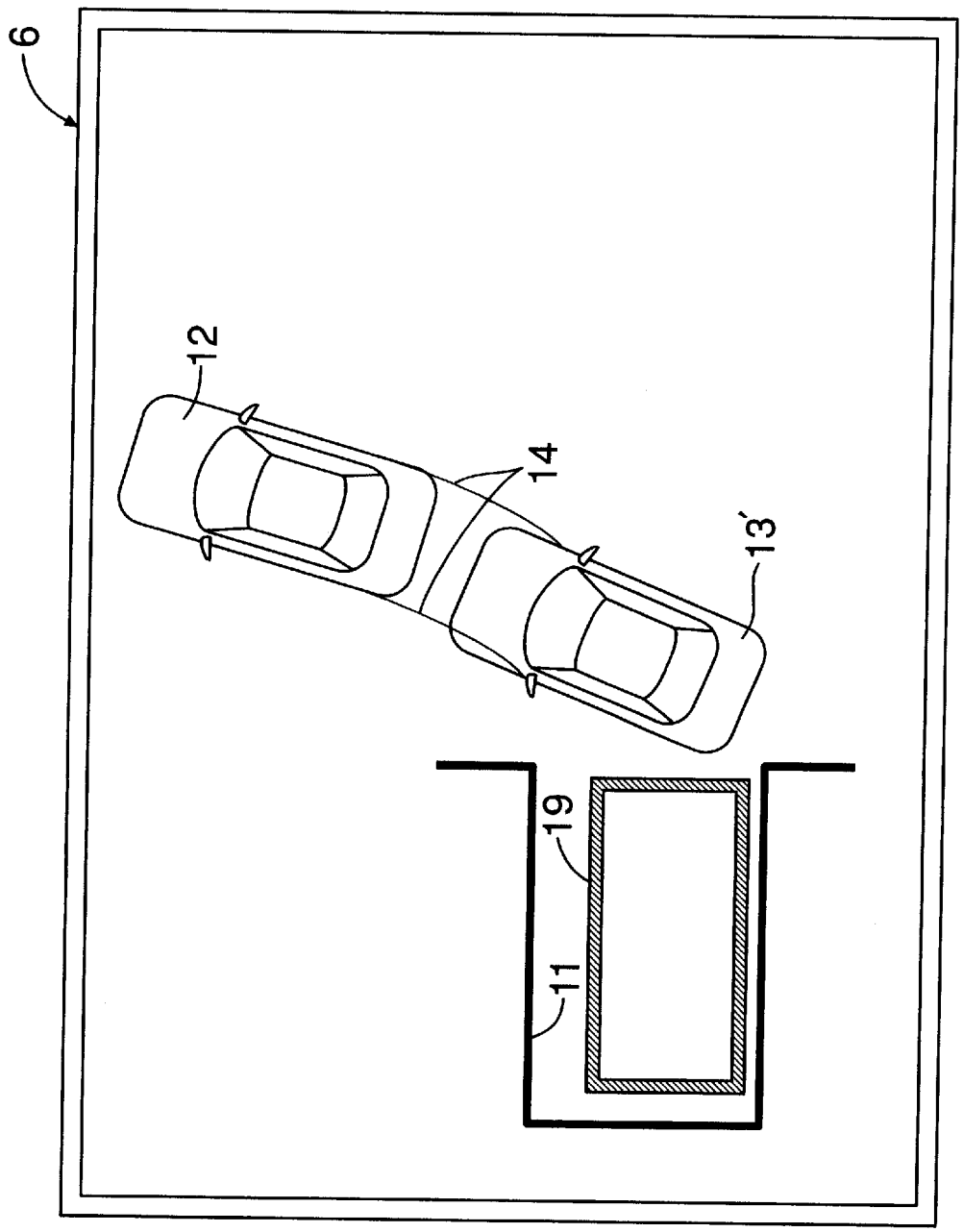
Figure 19:
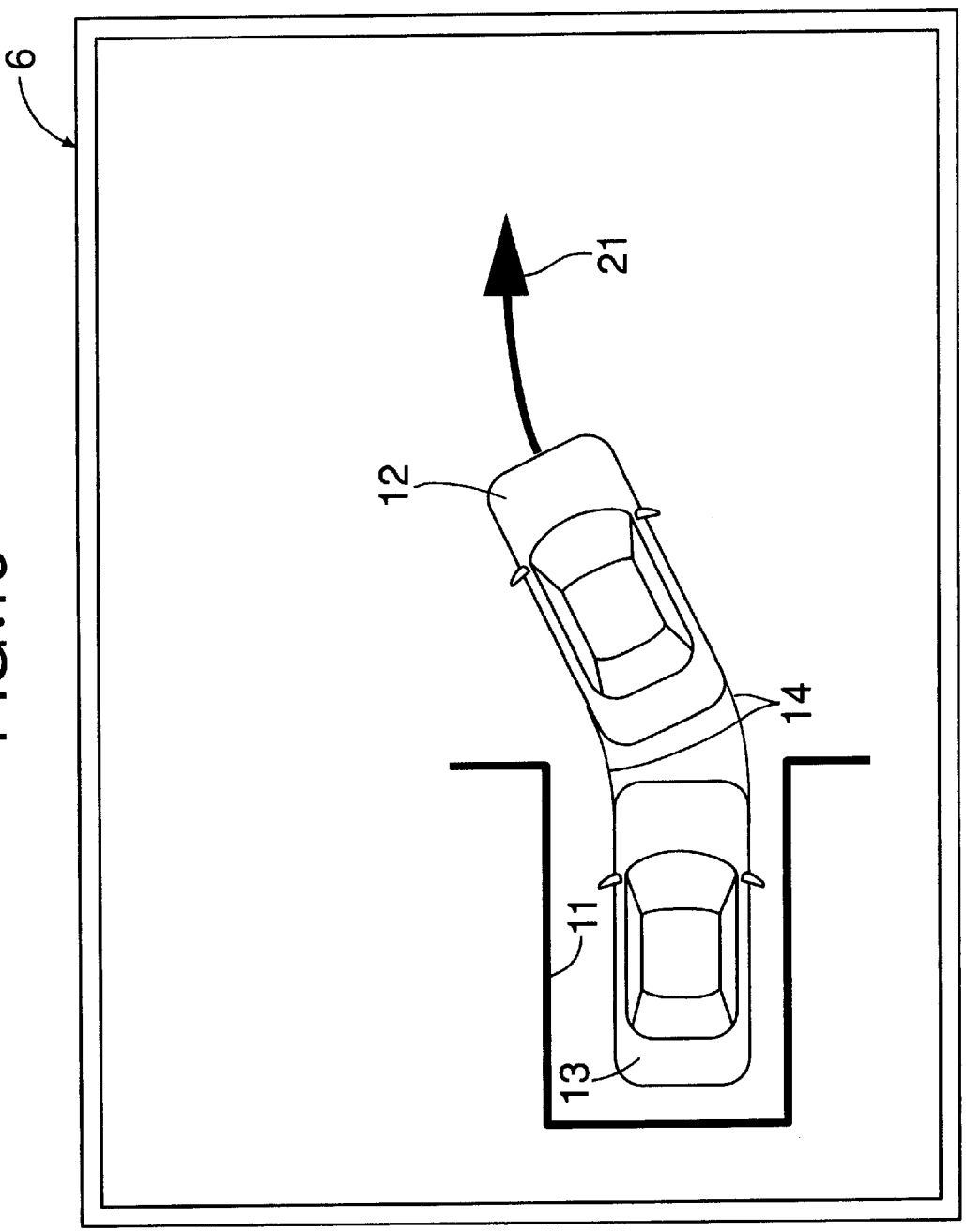

On the other hand, if the expected parking position 13 has been already housed in the parking section 11 at Step S25, as shown in FIG. 18, namely, if the target turn-back position 19 has been housed in the parking section 11, a message such as "move the vehicle backwards in the direction of the arrow," may be displayed or sounded by voice. The driver steers the vehicle in the direction of the arrow 21 at Step S29, then moves the vehicle forwards at Step S30, as shown in FIG. 19, and adjusts the position of the vehicle, for example, leftwards so that the expected parking position 13 is located at the center of the parking section 11. Thereafter, the processing is returned to Step S5 to repeat the parking operation aiding control operation again, whereby the parking operation can be completed.

Although the embodiments of the present invention have been described in detail, it will be understood that the present invention is not limited to the above-described embodiments, and various modifications in design may be made without departing from the spirit and scope of the invention defined in claims.

What is claimed is:

1. A parking operation aiding system comprising:
    a display for displaying parking-aiding information including at least a target parking position and a vehicle position, so that said parking-aiding information can be visually confirmed by a driver of the vehicle;
    a locus calculating means for calculating an expected movement locus at the time point when the vehicle has first been moved, based on a predetermined steering angle;
    an interference determining means for determining whether the expected movement locus calculated by the locus calculating means will interfere with the target parking position; and
    an information determining means for determining subsequent parking operation aiding information based on the result of said determination by said interference determining means.

2. A parking operation aiding system according to claim 1, wherein said display further displays the expected movement locus calculated by said locus calculating means so that the expected movement locus can be visually confirmed by the driver, and changes the display of a positional relationship of the expected movement locus to the target parking position in response to at least either one of the movement of the vehicle and the change of a steering angle of the vehicle.

3. A parking operation aiding system according to claim 1 or 2, wherein the predetermined steering angle is the largest clockwise or largest counterclockwise steering angle.

4. A parking operation aiding system according to claim 1, wherein said display further displays an expected parking position on the expected movement locus.

5. A parking operation aiding system according to claim 4, wherein said interference determining means determines whether the expected movement locus will interfere with the target parking position when the expected parking position is matched with the target parking position.

6. A parking operation aiding system according to claim 5, wherein said interference determining means determines that the expected movement locus will interfere with the target parking position when an inner side of the vehicle as viewed in a turning direction, during movement of the vehicle toward the target parking position, will interfere with a portion of the target parking position laying inside the turning direction.

7. A parking operation aiding system according to claim 1, wherein said display displays an interfering position when said interference determining means determines that the expected movement locus will interfere with the target parking position, so that said interfering position can be visually confirmed by the driver.

8. A parking operation aiding system according to claim 1, wherein parking operation aiding information for requesting the driver to confirm a presence of another vehicle located sideways of the target parking position is provided to the driver when said interference determining means determines that the expected movement locus will interfere with the target parking position.

9. A parking operation aiding system according to claim 1, wherein when said information determining means includes a turn-back validity determining means for determining whether an interference can be avoided by a turn-back movement of the vehicle when said interference determining means determines that the expected movement locus will interfere with the target parking position.

10. A parking operation aiding system according to claim 9, wherein said turn-back validity determining means determines that the turn-back movement is valid when an extension line from a side of the vehicle does not contact the target parking position.

11. A parking operation aiding system according to claim 9, wherein said information determining means includes a selecting means for selecting the turn-back movement, and when the turn-back movement is selected, said locus calculating means selects an expected movement locus which will not interfere with the target parking position and the display displays a target turn-back position closer to the target parking position on said expected movement locus.

12. A parking operation aiding system according to claim 10, wherein said information determining means includes a selecting means for selecting the turn-back movement, and when the turn-back movement is selected, said locus calculating means selects an expected movement locus which will not interfere with the target parking position and the display displays a target turn-back position closer to the target parking position on said expected movement locus.

13. A parking operation aiding system according to claim 11, wherein said display displays an expected movement locus based on an actual steering angle in place of displaying the expected movement locus, and displays a target turn-back position based on said expected movement locus, on top said expected movement locus.

14. A parking operation aiding system according to claim 12, wherein said display displays an expected movement locus based on an actual steering angle in place of displaying the expected movement locus, and displays a target turn-back position based on said expected movement locus, on top said expected movement locus.

15. A parking operation aiding system according to claim 13, wherein when the vehicle reaches the target turn-back position and the turn-back operation is started, said display displays a parking operation aiding information indicating a moving direction for the vehicle.

16. A parking operation aiding system according to claim 14, wherein when the vehicle reaches the target turn-back position and the turn-back operation is started, said display displays a parking operation aiding information indicating a moving direction for the vehicle.

17. A parking operation aiding system according to claim 1, wherein when said interference determining means determines that the expected movement locus will not interfere with the target parking position, subsequent parking operation aiding information is indicated, and when such indication is carried out, said locus calculating means calculates an expected movement locus depending on an actual steering angle, and said display displays said expected movement locus depending on the actual steering angle.

18. A parking operation aiding system according to claim 17, wherein said display displays said expected movement locus depending on the actual steering angle in place of the expected movement locus depending on the predetermined steering angle, and also displays an expected parking position depending on said expected movement locus depending on the actual steering angle on said expected movement locus.

19. A parking operation aiding system according to claim 18, wherein said display changes the displaying form between a displaying form depending on the predetermined steering angle and a displaying form depending on the actual steering angle.

20. A parking operation aiding system according to claim 19, wherein the change of the displaying is at least one of the change of a displayed color and the change of the type of a displayed line.

21. A parking operation aiding system according to claim 17, wherein said display displays said subsequent parking operation aiding information is indicated.

22. A parking operation aiding system according to claim 17, wherein said display displays a visual prompt to the diver to carry out a driving operation, and when said driving operation is carried out, said locus calculating means calculates an expected movement locus depending on an actual steering angle, and said display displays said expected movement locus depending on the actual steering angle.

23. A parking operation aiding system according to claim 1, further comprising a sound generating means for generating an audio sound indicating to the driver to view the display.

24. A parking operation aiding system according to claim 1, further comprising a sound generating means for generating interactive audio messages to aid the driver with said parking operation.

* * * * *